(12) United States Patent
Reimann

(10) Patent No.: US 9,945,930 B2
(45) Date of Patent: Apr. 17, 2018

(54) SYSTEM AND METHOD FOR DETERMINING AN ORIENTATION OR POSITION OF A RECEIVER RELATIVE TO AN EMISSION DEVICE

(71) Applicant: LAMBDA:4 ENTWICKLUNGEN GMBH, Hamburg (DE)

(72) Inventor: Rönne Reimann, Hamburg (DE)

(73) Assignee: Lambda:4 Entwicklungen GmbH, Hamburg (DE)

( * ) Notice: Subject to any disclaimer, the term of this patent is extended or adjusted under 35 U.S.C. 154(b) by 0 days.

(21) Appl. No.: 14/832,336

(22) Filed: Aug. 21, 2015

(65) Prior Publication Data

US 2016/0041253 A1   Feb. 11, 2016

Related U.S. Application Data

(62) Division of application No. 14/118,364, filed as application No. PCT/EP2011/060959 on Jun. 29, 2011, now Pat. No. 9,215,563.

(30) Foreign Application Priority Data

May 18, 2011   (DE) .................... 20 2011 100 883 U

(51) Int. Cl.
*H04B 7/14*   (2006.01)
*G01S 5/10*   (2006.01)
(Continued)

(52) U.S. Cl.
CPC ............... *G01S 5/10* (2013.01); *G01S 3/143* (2013.01); *G01S 3/48* (2013.01); *G01S 5/0247* (2013.01);
(Continued)

(58) Field of Classification Search
CPC ..................................................... G01S 13/756
(Continued)

(56) References Cited

U.S. PATENT DOCUMENTS 2,705,320 A   3/1955   Palmer
5,220,332 A   6/1993   Beckner et al.
(Continued)

FOREIGN PATENT DOCUMENTS

DE   884831   7/1953
DE   2843253   4/1980
(Continued)

OTHER PUBLICATIONS

Wehner, M.; Richter, R.; Zeisberg, S.; Michler, O., "High resolution approach for phase based TOF ranging using compressive sampling," Positioning Navigation and Communication (WPNC), 2011 8th Workshop, pp. 28-32, Apr. 2011, Print ISBN:978-1-4577-0449-9.

(Continued)

*Primary Examiner* — Thomas Lett
(74) *Attorney, Agent, or Firm* — Sand & Sebolt

(57) ABSTRACT

A method, device, system and use for determining a distance, location and/or orientation including the at least relative determination of a position of at least one object using at least two active anchors. A first signal is emitted by a first of the two anchors and is received at the object and by a second of said two anchors. A phase measurement is performed at said second anchor and wherein a distance determination with respect to said first anchor is performed and/or the distance from said first anchor to said second anchor is known. A second, particularly electromagnetic, signal is emitted from said second anchor, and information on phase measurement and distance between said first and second anchors is made available to a computation unit and (Continued)

at least one phase measurement respectively of said first and second signal is performed at said object and made available to said computation unit.

29 Claims, 8 Drawing Sheets

(51) Int. Cl.
| | |
|---|---|
| G01S 3/14 | (2006.01) |
| G01S 3/48 | (2006.01) |
| G01S 5/02 | (2010.01) |
| G01S 7/35 | (2006.01) |
| G01S 11/02 | (2010.01) |
| G01S 11/10 | (2006.01) |
| G01S 13/84 | (2006.01) |
| H04W 4/02 | (2018.01) |
| G01S 17/74 | (2006.01) |
| H04W 4/22 | (2009.01) |

(52) U.S. Cl.
CPC .............. *G01S 5/0252* (2013.01); *G01S 7/35* (2013.01); *G01S 11/02* (2013.01); *G01S 11/026* (2013.01); *G01S 11/10* (2013.01); *G01S 13/84* (2013.01); *G01S 17/74* (2013.01); *H04W 4/023* (2013.01); *H04W 4/026* (2013.01); *H04W 4/22* (2013.01)

(58) Field of Classification Search
USPC ...................................................... 455/67.16
See application file for complete search history.

(56) References Cited

U.S. PATENT DOCUMENTS

| | | | |
|---|---|---|---|
| 5,748,891 A | 5/1998 | Fleming et al. | |
| 5,892,454 A | 4/1999 | Schipper et al. | |
| 6,864,832 B2 | 3/2005 | Mende et al. | |
| 7,359,719 B1* | 4/2008 | Duffett-Smith | G01S 1/024 |
| | | | 342/387 |
| 9,319,840 B2 | 4/2016 | Porzio Giusto | |
| 9,442,192 B2* | 9/2016 | Durgin | G01S 13/756 |
| 2002/0111772 A1* | 8/2002 | Skidmore | H04L 41/12 |
| | | | 702/186 |
| 2004/0178955 A1* | 9/2004 | Menache | A63F 13/06 |
| | | | 342/463 |
| 2004/0260506 A1* | 12/2004 | Jones | G01S 1/08 |
| | | | 702/150 |
| 2005/0206555 A1 | 9/2005 | Bridgelall et al. | |
| 2008/0143584 A1 | 6/2008 | Shoarinejad et al. | |
| 2008/0204322 A1 | 8/2008 | Oswald et al. | |
| 2009/0111582 A1* | 4/2009 | Schuler | A63B 24/0021 |
| | | | 463/42 |
| 2009/0243932 A1 | 10/2009 | Moshfeghi | |
| 2010/0019955 A1* | 1/2010 | Durgin | G01S 13/756 |
| | | | 342/156 |
| 2010/0195086 A1 | 8/2010 | Ossig et al. | |
| 2010/0309051 A1 | 12/2010 | Moshfeghi | |
| 2010/0311436 A1 | 12/2010 | Bevan et al. | |
| 2010/0328073 A1* | 12/2010 | Nikitin | G01S 5/0247 |
| | | | 340/572.1 |
| 2011/0001659 A1* | 1/2011 | Hampel | G01S 3/74 |
| | | | 342/120 |
| 2012/0126973 A1* | 5/2012 | DeAngelis | A63B 24/0021 |
| | | | 340/539.13 |
| 2012/0223811 A1* | 9/2012 | Wild | G01S 3/48 |
| | | | 340/10.1 |
| 2013/0211270 A1* | 8/2013 | St. Laurent | A61B 5/682 |
| | | | 600/508 |
| 2013/0310074 A1 | 11/2013 | Porzio Giusto | |
| 2014/0063542 A1* | 3/2014 | Aoki | G06F 3/1296 |
| | | | 358/1.15 |
| 2015/0048973 A1 | 2/2015 | Whitehead | |
| 2015/0268350 A1 | 9/2015 | Whitehead | |

FOREIGN PATENT DOCUMENTS

| | | |
|---|---|---|
| DE | 10038346 | 6/2001 |
| DE | 102009060591 | 7/2010 |
| DE | 102009060592 | 7/2010 |
| DE | 102009060593 | 7/2010 |
| EP | 1815267 | 8/2007 |
| EP | 2196823 | 6/2010 |
| EP | 2212705 | 8/2010 |
| EP | 2259083 | 12/2010 |
| WO | 87/03697 | 6/1987 |
| WO | 02/073562 | 9/2002 |
| WO | 2004/035357 | 4/2004 |
| WO | 2007/013069 | 2/2007 |

OTHER PUBLICATIONS

Wolfram Kluge and Dietmar Eggert, "Project: IEEE P802.15 Working Group for Wireless Personal Area Networks (WPANs)", Slides 1-21, IEEE 802.15-09-0613-01-004f, Nov. 2009.

Mizui, K.; Uchida, M.; Nakagawa, M., "Vehicle-to-vehicle 2-way communication and ranging system using spread spectrum technique: proposal of double boomerang transmission system," Vehicle Navigation and Information Systems Conference, 1994. Proceedings., pp. 153-158, XP010136540, Print ISBN:0-7803-2105-7.

* cited by examiner

SYSTEM AND METHOD FOR DETERMINING AN ORIENTATION OR POSITION OF A RECEIVER RELATIVE TO AN EMISSION DEVICE

CROSS-REFERENCE TO RELATED APPLICATIONS

This application is a divisional of U.S. patent application Ser. No. 14/118,364, filed Nov. 18, 2013, which is a National Stage Entry of PCT/EP2011/060959 filed Jun. 29, 2011, which claims priority from DE 20 2011 100 883.9 filed on May 18, 2011.

TECHNICAL FIELD

The invention relates to a method, device, system and use for the determination of a distance, location and/or orientation.

BACKGROUND ART

The most trivial form of distance measurement is to measure the period of time it takes for a wave package to travel from a first object to a second and back (signal return time). This allows, on the basis of the usually constant signal travelling speed, to directly deduce the distance. However, due to the high velocity of light and the problems connected to exact time measurement, such method is relatively inaccurate and/or complex.

In view of improving the situation, a distance-measurement method had become known as early as in the middle of last century, which was based on the installation of the Michelson-Interferometer and which works on the basis of phase shift. It is also called Distance Interferometry.

At first, this method certainly is ambiguous, since the distance can only be determined modulo half the wavelength. However, numerous methods are known to remedy that disadvantage, such as from DE 100 38 346 A1 for example. Here, in order to determine the distance, the phase is measured as a basis for calculating the signal return time, which again serves as basis to calculate the distance. The major difference now consists in the fact that the phase allows for a very high resolution, even with simple components, since phase position can usually be determined with an accuracy of few degrees. For wavelengths in the 100 nm to 10 cm range, this leads to resolutions in the nm to mm range.

Thus there are basically two different types of distance measurement methods. Distance measurement by means of phase measurement has been known for a long time different measurement methods developed around the two kinds of distance measurement, which attempt to remedy the respective disadvantages. Concerning the measurement of signal run time reference is made to WO2004/035357, EP 1815267A1, XP 010 136 540 or WO02073562 for example.

Methods which are based on the measurement of phase shift are to be distinguished there from. The present application is concerned with measurement improvement on the basis of the measurement of phase shift. Also on the basis of this principle, special measurement processes have been developed in the attempt of avoiding disadvantages. Thus, for example the low reflected signal intensity or phase jumps which occur in the reflection, constitute problems which can be avoided by certain. This, however, generally leads to a higher complexity of the required circuits, and therefore causes higher costs and a higher susceptibility to environmental influences such as reflections at other objects.

It is known, for example, to use a signal emitted from a first object and reflected at a second object, in order to analyze the phase shift between the emitted and the received signal, in order to determine the distance on that basis.

Furthermore, it is known, to emit a first signal from a first object and to receive it at a second object and to emit a signal from that second object, which signal is generated with a phase in a certain relationship to the wave received at the second object. This second signal is then again received at the first object and is analyzed with reference to the phase difference to the wave emitted at the first object. The result allows for calculation of the distance between the objects.

These methods as described, however, come with numerous disadvantages. For example the use of a signal which was solely reflected on the second object leads to an only very low signal intensity of the reflected wave being available. Further, due to the reflection at different objects, numerous different reflections need to be evaluated.

If a method is used in which a wave is emitted from the second object, the phase of which is in a fixed relationship with the phase of the first wave received on the second object, the problem arises, that reception and emission at the second object are happening simultaneously. This causes numerous problems, since the individual fields overlap, which has a negative influence on the measurement or makes it difficult, if not sometimes even impossible, to separate the individual signals which lie in the same band—that is, with possibly very different levels of intensity (differences of up to 100 db are nothing out of the ordinary). In addition to that, the generation of a wave in phase correlation is relatively complex.

In many applications of phase measurement therefore phase- and/or time-coupled systems are necessary. In a skilled measurement installation, however, this is not necessarily required. Even extremely far de-coupled systems are possible, in which the oscillators are not coupled either, when emitting and receiving. An analysis of the phase angles is nevertheless possible. Such a method is known from EP 2196823, for example.

Another method which is based on the measurement of the phase position, which however always requires a double signal return, because it considers the difference of frequencies and phase angles, in order to avoid problems in the measurement, is known from DE102009060591A1, DE102009060592A1 or DE102009060593A1. By considering the difference, problems which are due to a relative movement, can be avoided. Similar processes are also known from "High Resolution Approach for Phase Based TOF Ranging using Compressive Sampling" by Markus Wehner, Robert Richter, Sven Zeisberg, Oliver Michler, or from IEEE 802.15-09-0613-01-004f by Wolfram Kluge.

Additionally, numerous further methods are known for improving the transmission and measurement. For example, it is known from EP 2259083 A to de-correlate emitted signals in relation to the polarization and/or emission characteristic. This is how it becomes possible, at a receiver, to analyze even in a complex environment the propagation paths or the location of the emitter for example, especially by means of the amplitudes and/or phase positions of the individual wave trains received. If for example an emitter according to the invention is positioned outside a shielded room, and if the shielding of such room has two leaks, such leaks can be located by a correspondingly equipped reception device. When a traditional emitter with no de-correlation is used, this would not be possible, since the signals entering through the leakages would overlap. An analysis of the signal-run times is thus no longer required. This is how numerous problems in the evaluation of distance and/or orientation measurements can be avoided.

From EP 2212705 for example, a method for determining the direction of incidence and other characteristics of a de-correlated wave field is known.

Furthermore, it is also known, from GPS for example, to provide infrastructures which allow the determination of the position also of passive objects. However, systems of such type or respectively infrastructures, come with the disadvantage that either the receivers are complex and expensive, do not work or work only insufficiently within closed buildings, the installation of the infrastructure is complex and costly and/or the position determination is relatively inaccurate.

DISCLOSURE OF INVENTION

It therefore is an object of the invention to provide a method, or respectively suitable anchors, a system or a use which makes it possible to accurately determine the position of, particularly a multiplicity of, objects in a simple and reliable way. In addition, the system itself, or respectively its anchors, as well as its installation should be, straightforward and low priced. Furthermore, it should not be necessary that the anchors be connected among each other by means of a complex infrastructure, such as for example cabling.

The method, respectively system, or the anchors also should be suited to guarantee a position determination for a multiplicity of, particularly passive, objects.

An inventive method for at least a relative determination of a position of at least one, particularly passive, object makes use of at least two active anchors which are spaced apart from each other. An anchor would be a component of said system, which emits signals; particularly electromagnetic signals, on which basis the object or respectively objects can carry out position determinations.

In the inventive method a first, particularly electromagnetic, signal is emitted from a first of the at least two anchors and is received at at least one second of the at least two anchors.

Advantageously, air or water is used as carrier for the emission and transmission to the object. However, other ways of transmission are conceivable. In the case of freely movable objects, however, the use of wireless transmission paths is of advantage. The transmission to at least a second of the at least two anchors can also be performed through various different ways.

Advantageously, the same transmission channel, particularly the same wireless transmission channel, is used. However, also a transmission through a conductor, particularly a cable, is conceivable. This is possible because the anchors are mostly stationary. However, this requires an increased installation effort.

In the inventive method, a phase measurement is performed in at least one second anchor. This can be carried out for example, with respect to an internal reference generator, for example an oscillator.

In the inventive method, furthermore a distance determination of at least on second anchor to the first anchor is performed and/or the distance from the first anchor to the at least one second anchor is known. Here what matters is that the distance between the first and the at least one second anchor eventually be known. This can be obtained in several different ways. For example, a distance measurement can be performed in a calibration of the system, or with each or some signal transmission a new distance measurement can be carried out. It can also be suitable to determine the positions of the anchors, or respectively their distances, in a different way. Combinations are possible. Advantageously, not only the distance between the individual anchors is known, but also the individual, at least relative orientations and/or locations of the anchors are known.

According to the inventive method, furthermore a second, particularly electromagnetic, signal is emitted from the at least one second anchor. As transmission channel, advantageously one, particularly the same wireless medium, is used again. However, alternatives are possible.

Furthermore, according to the inventive method, an information on the phase measurement and the distance between the first and the at least one second anchor, particularly at least relative locations and/or orientations, are notified to a computation unit which is furnished to compute the distance and might be located within or at the object. The information on the phase measurement is on a phase measurement at at least one second anchor, which also emits a second signal. The information about the phase measurement can be made known to the object in many different ways. Furthermore it is not important, when the notification occurs. The information on the phase measurement is transmitted advantageously via the same wireless medium, particularly emitted as an electromagnetic signal. The type of information can be variable. Thus, for example a measurement value can be transmitted, or in the emission of the signal simultaneously a measurement value can be transmitted, impressed or modulated upon, or the second signal in itself can be modified accordingly, particularly with respect to the first signal, particularly can be emitted, or respectively generated with a phase shift providing the information, especially in relation to the first signal.

The distance between the first and the at least second anchor can be notified to the computation unit, especially located within the object, in several different ways as well. For example, a data package, particularly based on electromagnetic waves, can be transmitted to the computation unit, particularly via the wireless transmission medium which already has been used.

Advantageously, not only the distance but particularly also the relative position of the anchors to each other or respectively their absolute position, is notified. The point in time of the notification also is relatively non-crucial. For the evaluation of the measurement, the determination of distance, orientation and/or location, the information solely has to eventually be available at the object, or respectively at some other point that the computation unit is located and does the determination based on the measurements and information. However, if the method is performed several times and with several anchors, it can be of advantage, or respectively will be of advantage, to postpone the notification of information to a relatively late point in time in the method. Particularly, at first all the signals, particularly of one set of emissions, of the anchors are transmitted, before the information is transmitted or respectively notified. In an alternative embodiment, the information on the distance, or respectively position of the anchors can already previously have been notified, or respectively can have been stored and/or deposited in the computation unit or a location to which the computation unit has access. The measurement values might be transmitted to the computation unit that performs the determination. Alternatively the values of measurements can be stored until the information on distances and/or locations are available or supplied, e.g. after more than one emission of each anchor.

In the inventive method, respectively one phase measurement of the first and of the at least one second signal are performed at the object. That means that the object performs one phase measurement with respect to the first signal and at least one phase measurement with at least one second signal, particularly with reference to all the second signals respectively. This can be carried out for example against an internal reference oscillator, such as for example an oscillating circuit. This measurement is made available to the computation unit that might be located within the object. On the basis of the phase measurements as performed at the object and the information as notified to the computation unit by the anchors and/or infrastructure, a distance difference between the distance between the object and the first anchor and the distance between the object and at least one second anchor and/or at least one distance difference between the distance between the object and the first anchor and at least one length of a distance from the first, via the at least one second anchor to the object is determined.

Based on this method, information on the distance of the object to the anchors can be obtained. If several anchors are used, or if further constraints are given, or additional position-, or respectively distance-determination methods, are being used, the relative position with respect to the anchor can be determined, and, with the knowledge of the position of the anchors, also the absolute position of the object, or respectively a multiplicity of objects, can be determined.

The computation unit might make the determination or the results of its computations available to the object, one or more anchors and/or a different device, location or person. If the computation unit is located within the object the results and determinations might already be available to the rest of the object or not used further in the object.

Depending on the case of application, it can be of advantage, to keep the anchors stationary, at least for the duration of a measurement, or respectively of one emission of all the anchors.

In other applications, advantageously mobile anchors can be used. Also mobile and stationary anchors can be used in a mixed system. Furthermore, if anchors are moving fast and/or partially are situated beyond range, the system can work with a different sub-quantity of the anchors, or can temporarily take additional anchors, which temporarily are situated within range, into the system.

In the case of anchors which are moving during a measurement or respectively during the time period of the emissions and receptions are used for the determination, the position of each moving anchor has to be known with sufficient accuracy at the point in time of its emission and phase measurement only. For such a position determination, several methods or respectively means, particularly those described here for calibration, can be used. Also, the position modification can be calculated, starting from a known position and with the knowledge of the acceleration values and/or speeds.

Advantageously, with moving anchors, also their acceleration and/or speed is known and/or measured at the time of emission and/or reception/phase measurement or they are determined and used in order to thus at least partially be able to avoid or respectively subtract possibly occurring influences on measurements.

Anchors can be arranged for example on drones, aircrafts, helicopters and/or cars.

The advantage of the inventive method consists in the fact that independently of each other and also simultaneously, numerous, or practically an indefinite number of objects can determine their positions at the same time against a system according to this invention, especially if the computation units are placed at or within the objects. Particularly, while doing so, they do not have to disclose their position or respectively any information with respect to their presence if the computation unit doing the determination regarding an object is placed at or within the object. Thus, also the question of data protection is covered. Particularly, owing to the independent determination on the individual objects, there is no limitation to the number of objects. Further, the calculation of the locations within the objects can be performed without any problems by way of relatively simple computation units. For example such a method could be used for the determination of locations of appropriately equipped mobile telephones. Furthermore, the required hardware can be realized at low cost and with minimum space requirements. Particularly, a very simple phase-measurement mean and a relatively simple computing unit, especially within in the object, are sufficient. Further means like a reception unit for the reception of information regarding the phase measurements of the anchors and/or distance, or respectively location information could be integrated. If the computation unit is not placed at or within the object, the phase measurements at the object need to be transmitted/made available correspondingly and the notified information and phase measurements of the anchors have to be made available to the computing unit but not necessarily to the object.

The notification of the information can be performed particularly digitally.

The advantages of the method furthermore consist in the fact that a good range is realized, because narrow-bandwidth signals can be used. Here, a high degree of precision can be reached. As a matter of principle, any frequency band can be used, such that no particular deteriorations occur at the place of application.

Also, the necessary anchors can be installed and calibrated relatively easily and at low expenditure, because they do not necessarily require to be connected by any wiring with each other, and also do not have to be synchronized in terms of time, or respectively phase or frequency. A certain synchronization with reference to time, however, is necessarily obtained on the basis of the chronological sequence of the first and second emissions. However, such a rough synchronization would by no means suffice for distance determination on the basis of signal-run times and can be realized without any problems and with simple means. Also, the installation, or respectively calibration of such a system is possible at low cost and fast, as well as dependable.

An emission of a signal advantageously can also be the modification of a wave field. In such an embodiment, which is advantageous particularly if as at least partially passive object or anchor a RFID is incorporated into the method or system, at first a signal can be emitted from a trigger object/anchor/device, particularly from a different anchor, which signal also can constitute a signal according to the method.

Such signal can be modified, respectively influenced by the at least partially passive anchor, particularly RFID. In such influencing process, at least partially an influence originating from the at least partially passive anchor, in other words, a signal originating from said anchor, can be recognized, which can be used as a signal. One can also speak of a reflection of the signal, which modifies the wave field and constitutes a signal. Such modification usually is in a known phase relation to the original signal, which, if desired, can depend on the inclination of the polarization levels of the antennas to each other. Therefore, the phase measurement e.g. at the anchor can be turned into a measurement of the trigger signal, e.g. at the trigger device/anchor/object and a calculation to determine the phase at the influencing anchor/object/device, especially anchor as the distance to the anchor is known. In such a way, the method can be performed efficiently, particularly with short distances. Furthermore, it also is possible that an anchor performs an own emission, using the energy from the wave field of the first emitted signal, particularly of a different anchor.

Such an influence or signal can be different compared to the trigger signal e.g. regarding frequency, polarization, modulation and/or amplitude.

Advantageously, at least one further anchor is provided and further method steps are carried out after the performance of the emission of the first anchor and of the at least one second anchor. In such process, the at least one additional anchor performs at least one phase measurement of a signal which was previously emitted from one anchor, particularly last emitted from one anchor. That means that the anchors successively emit their corresponding signals and perform phase measurements. In such process, usually one anchor advantageously performs at least one phase measurement with reference to the signal which was emitted from the anchor that emitted last, before the respective anchor emits. Advantageously, the nearest anchor emits next, after the emission of an anchor.

On the basis of such a sequence of emissions and phase measurements, a particularly good result of the distance determination, or respectively of the position determination can be obtained, because here the relevant signals can be generated in a very close chronological sequence to each other in a relatively small time interval. This can take place without the individual signals having any negative influence on each other, since the relevant signals can be transmitted one after the other. According to the advantageous method in such process, a distance determination to another anchor, particularly to the first, second anchor and/or to the anchor, which emitted previously is performed on at least the at least one further anchor, or a distance from the at least one further anchor to another anchor, particularly to the first, second and/or to the anchor, which has been emitting before, is known. Here, it only is of importance, that a corresponding distance to another anchor is known for the transmission. In what way it is generated, is relatively non-crucial, as already explained above. To which anchor the distance is known, is not important either. What matters is only that in the anchor network, which is to be used for distance determination or position determination respectively, for each anchor at least one distance to another anchor is known. Advantageously, however, the distance from all the anchors to all the anchors and/or their relative positions is known. Particularly advantageously, the absolute positions of the anchors, or respectively the relative positions with reference to an additional structure, such as for example a building's blueprint, are known.

According to the advantageous method the at least one further anchor emits at least one further, particularly electromagnetic, signal. In such process, the above explanations are applicable with reference to the transmission paths and forms.

Furthermore, according to the advantageous process at least one information on the phase measurement and the distance between one anchor, particularly between the first, second anchor and/or the anchor, which has been emitting before, and the at least one further anchor is notified to the computation unit. Here also, the above explanations relating to the type of notification and to the point in time of the notification apply.

Furthermore, according to an advantageous method at least one distance difference between the distance between the object and an anchor, particularly the anchor which has been emitting before, and at least one distance between the object and the at least one further anchor is determined. As an alternative or additionally, at least one distance difference between the distance between the object and an anchor, particularly an anchor which has been emitting before, and at least one length of a distance from one anchor, particularly the anchor which has been emitting before, is determined via the at least one further anchor, to the object.

By way of such determination of the distance differences or respectively distance, again information relating to the location of the object can be gained, such that eventually the distances between the object and the anchors, and thus eventually the relative location of the object can be determined. Advantageously, a multiplicity of anchors is used and thus the method is performed by means of a multiplicity of anchors, and correspondingly often times at the object. This is how an accurate picture of the location, or respectively position of the objects can be obtained.

Advantageously, the method steps relating to the further anchor and to the further signal are performed at least after completion of the emissions and measurements of the phases. Particularly, the method steps relating to the further anchor and to the further signal are performed before a notification of an anchor to the computation unit. At first, the signals are emitted and the measurements are performed, and then the information is notified. This particularly applies to the information which is transmitted through the same transmission channel as the signals. This is of advantage, because in that case the transmissions of the signals are not influenced and can be performed relatively fast one after another. This is of advantage particularly for moving objects. If the information relating to the location/distances has already been notified before, or for example is stored in/at or with access of the computation unit, the notification relating to location and/or distance is not crucial.

Advantageously, the relative location of the at least one object to the anchors is determined by means of the inventive method. Advantageously, the absolute location is determined on the basis of absolute information on the point of location of at least one anchor. In such a method, the advantages of the invention become clearly apparent, because a position of an object can be determined in a simple way.

Advantageously, at any one time only one signal is emitted from one anchor, particularly from all anchors. This avoids influences of the individual signals or measurements, such that a particularly reliable determination becomes possible.

Advantageously, the object is not synchronized with any of the anchors and/or the anchors are not synchronized among each other, particularly not in relation to a time, frequency and/or phase. This makes it possible to provide a particularly low-cost and simple as well as sturdy realization of the objects and anchors. In most instances, however, a loose, or respectively rough chronological synchronization of the anchors and/or the at least one object cannot be avoided, since for a time-related structurization of the signal sequence, or respectively of the information transmission, such synchronization is required, or respectively is inevitably obtained solely from the signals or respectively information. Such a synchronization, however, usually does not provide a higher accuracy than +/−100 micro seconds. For a distance determination on the basis of the synchronization of the times, which are particularly required for a run-time measurement, this would by no means suffice. For such purpose, degrees of accuracy of approximately 0.006 micro seconds for a resolution of +/−1 meters would be necessary, which are much more difficult to be realized, and at substantially higher cost.

However, when the objects or anchors are synchronized correspondingly, this does not have a negative effect. It is only of advantage to neglect the non-appearance of the synchronization in relation to the process efficiency, which would be clearly deteriorated by a constant synchronization, as well as in relation to the necessary hardware.

Advantageously, the method for improving the determination, is repeated several times. This is how the measuring error can be reduced considerably. It is also possible to only repeat individual steps of the method, especially groups of one signal and the corresponding phase measurements at one anchor and the object.

It is advantageous, that the method be performed repeatedly in order to exclude ambiguities, particularly phase-related ambiguities, particularly with signals of different frequencies. In a distance determination based on the phase usually ambiguities are present, depending on the distance and frequencies or respectively wave lengths used. Such ambiguities can be reduced by using a multiplicity of anchors. However, usually it is more appropriate, when the number of anchors is relatively low, to repeat the method steps with different frequencies, or respectively frequency differences, or respectively wave lengths, or respectively wave-length differences, in order to exclude ambiguities. Also other methods for a rough determination can be applied, such that then repetitions or the use of a very high number of anchors is not required, in order to exclude ambiguities, because this is already possible on the basis of the rough measurements which are performed in the same and/or a different way. This particularly is also the case, when the positions of objects are to be determined, which move slowly or with a determined speed, and when an initial position or a chronologically earlier position is known. The ambiguities can be excluded by calculating the expected position/distance. In order to exclude ambiguities, the method can be repeated in different ways. For example, one entire method cycle can first be finalized, and then be repeated with the same and/or different frequencies. It is, however, also possible, to first repeat individual steps of the method, and then to proceed into the next method step. Thus, it is for example possible to emit several first signals with the same and/or different frequencies and to perform corresponding phase measurements, and then to emit a multiplicity of second signals with the same and/or different frequencies from a second anchor, and to then again perform corresponding measurements. In the following, the corresponding information can be transmitted. The information can also be transmitted at a different point in time. Other anchors can also be incorporated into such a partial repetition with the same and/or different frequencies. It is also possible, for example, to emit only several first signals with the same and/or different frequencies and to only emit one second signal. Several combinations, or respectively partial repetitions are conceivable. In the process, however, it is advantageous that for every emitted signal a corresponding phase measurement is performed on the object, as well as on an anchor which is not emitting such signal, and be transmitted to the object or computing device.

In an alternative embodiment, the measurement result of a phase measurement and/or phase measurements can be transmitted separately to the computation unit, particularly independently of the at least one second or of further signals. Such an independent transmission for example, can be transmitted as a succeeding digital data package, particularly electromagnetically, particularly via a wireless medium. Depending on the system, such a de-coupling of the second signal and the information transmission can be of advantage.

In another embodiment, or additionally, the information on the phase measurement can be transmitted to the computation unit, especially located within/at the object, in the form of a phase shift of the second signal, or respectively of a further signal, as against the first signal, or respectively the second, or a further signal, at the time of reception at the second anchor, or respectively further anchor. Such an information transmission can accelerate the method, because here, the second signal and the corresponding information are emitted simultaneously without influencing each other as they are incorporated in one signal. Additionally, the computing requirement in the computation unit can be reduced. However, depending on the system, environment and other influences, a transmission of information is preferable. The notification of the information, or respectively of the location of the anchors or distances of the anchors from each other, can also be performed by means of the first, second or respectively further signal. Advantageously, however, this is not done, because usually it is not necessary, to notify such information in such shortly recurrent intervals in the system. In point of fact, it usually is sufficient, to provide such information relatively rarely in comparison to the emission of the signals, such that it is transmitted to the computation unit advantageously in another form, particularly in the form of separate date packages. It is also possible, however, to perform the transmission, or respectively notification of this information to the computation unit, or respectively to the objects, with only the first signal or with only every one-hundredth or n-th first, second and/or additional signal or in a last signal.

The most sensible way to proceed can vary, depending on the requirements, furthermore, the method can be modified dynamically, depending in how far the position of the anchors can be modified, or respectively over which time frame the anchors are stationary, and how often new objects are brought into the system. If the method is carried out with absolutely fixed anchors and known objects, the information in relation to the location of the anchors can also be stored in the objects and/or with access of the computation unit and/or be stored in the objects and/or with access of the computation after, particularly a one-off or rare, notification.

Advantageously, the anchors are at least partially, particularly entirely stationary. Here, such stationary location can be reflected in several different chronological frames. Particularly, they are stationary while the method is performed, particularly during one course of the method. Particularly advantageously, they also are stationary in relation to a multiplicity of repetitions of the method. A stationary location beyond that is not necessary. It is of particular advantage, when the anchors review their (relative) positions in regular intervals, even when they usually are stationary, and notify their information in relation to their distances, or respectively positions, with a corresponding update.

Advantageously, at least one probability is allocated to at least one measurement, particularly phase measurement, particularly each (phase) measurement. This can be done on the basis of different analyses and/or given conditions. Advantageously, not only one single probability is allocated to a measurement, but a particular distribution of probabilities is allocated to a measurement. This can happen, for example, based on the assumption of a distribution of measuring errors. For example, a Gaussian distribution of the measurement can be used as a basis, and as probability, the magnitude of the one-sigma interval can be assigned. Such an allocation of a probability or distribution of probabilities can be based on different analyses and/or given conditions. Thus for example all the phase measurements on the object can be allocated to an assumed inaccuracy of measurement, which is based on the accuracy of the components, for example in the form of the magnitude of the one-sigma interval. It particularly is conceivable that the phase measurement on the anchors is often substantially more accurate and thus can be assigned a clearly higher probability or respectively a lower value of the one-sigma interval.

Advantageously, furthermore a probability or respectively a distribution of probability of the location-, position- and/or orientation determination is determined and particularly maximized. This can be performed in several different ways. Such methods are known from the state of the art and can be implemented with an adaptation to the respective problem. As orientation, here particularly the orientation of the individual anchors with respect to each other, and in rare cases, also the orientation of the object can be considered. This can be performed, for example, on the basis of an inventive method with several different reception devices, for example at different ends or positions of the object.

At least on one anchor and/or on one object, several antennas can be used for de-correlation. Furthermore, several antennas can also be used for orientation determination of anchors and/or objects, particularly for a relative orientation determination of anchors with respect to each other. The de-correlation with several antennas provides advantages in relation to the determination of location, or respectively distance and/or orientation. This is how for example multipathing effects can be recognized and eliminated, such that a substantially more reliable determination becomes possible, even if the environment provides complex structures.

Advantageously, the de-correlation is performed on the basis of one or several processes of TX-de-correlation and/or RX-de-correlation.

A TX-de-correlation is the de-correlation during the emission. In such process, a signal is emitted, particularly with a time-shift, from one anchor via at least two antennas. It is also possible that several signals are used and emitted via respectively at least one of at least two antennas. Here, it is important that at least not all the signal be emitted, or respectively, not all the signals be emitted completely via the same emission characteristic. Particularly, the emitted signals provide a known phase relation to each other. By RX-de-correlation we understand a de-correlation in the reception. Here, particularly one signal is received, particularly with a time-shift, by at least one anchor and/or object via at least two antennas. Here it is also of importance that the reception of the signals not be performed via the same reception characteristic. In the selection of several antennas, also different combinations of antennas can be used for emissions. Such de-correlations can be performed particularly on such anchors, because here usually more space and power is available. In such process, an RX-de-correlation, at least with two antennas, can be performed relatively easily in the object. What therefore is preferred, is a TX and RX-de-correlation in the communication between the anchors, and thus particularly in the emission of the first, second and further signals, as well as in the phase determination on the anchors, as well as particularly also in the location/orientation determination of the anchors among each other, and particularly in addition, an RX-de-correlation at the objects.

Advantageously, with the de-correlation, information on phase measurements of at least two phase measurements is provided by at least one anchor to the computation unit and/or at least one anchor. Advantageously, phase information on each de-correlated measurement is provided to the computation unit. This is how the accuracy can be substantially increased. However, the person skilled in art will determine a commensurate amount of the transmitted information, or respectively phase measurements, and implement it correspondingly. It is also possible that more signals are transmitted than corresponding phase information is transmitted. Here, for example, a pre-selection or a summary of the individual measurements can be performed by the anchors, and corresponding phase measurements can be transmitted.

The problem also is solved by means of a method for the installation or calibration of a system for at least the relative position determination of an object, particularly according to an inventive method described herein, wherein the system provides at least one, particularly two or more anchors for the emission of, particularly electromagnetic, signals for position determination of the object. Advantageously, at least for a short period, at least particularly during the installation and/or calibration, at least one anchor, particularly all the anchors rest, in relation to their position and particularly also orientation.

Particularly, at least the position of one anchor is determined in absolute terms in relation to a blueprint and/or a point of reference. According to the inventive method, at least one distance, particularly also the orientation and/or relative position, between at least a number of anchor pairs, equaling the number of anchors minus one, particularly of all the anchors is determined. What is important, thus, is that at least the distance between the anchors is sufficiently known to determine the necessary distances.

Advantageously, also the position of each anchor to each other is determined. This increases the performance, the accuracy and the speed of the position- or respectively location determination of the objects. Such an installation or such a calibration is advantageously first performed before the position determination or respectively distance determination of the objects. Such an installation or such a calibration is advantageously continuously repeated or respectively verified and/or corrected in times where no position/distances/location of an object is determined and/or during times where at least the position/distances/location of one object is determined. By means of such a method, an inventive process can easily be initiated or to respectively a corresponding system can be installed.

Advantageously, at least one anchor and/or one object which receives the emitted signals, transmits data relating to the signals and/or especially phase information to a computing unit. The computing unit determines at least one location, position and/or orientation of at least one anchor/object. In the following, the at least one calculated location, position and/or orientation is transmitted to the system, particularly to one and/or several or respectively all anchors and/or the object. The transmission to the system can also be performed to a point which does not represent an anchor, which however notifies this information to the objects or respectively anchors. Such a method is advantageous, because owing to the additional computing power, the location or respectively orientation of the anchors to each other can be determined with a substantially higher accuracy, or respectively, within a shorter time window. This is how the speed of the installation, or respectively, calibration, as well as the location, orientation and/or position determination of the objects, as well as the accuracy are increased. Therefore, relatively little computing power can be provided in the anchors/objects, for example, only to verify the location or orientation of the anchors over a relatively long period of time. It is even possible to do completely without and to solely provide appropriate components to perform the phase measurements, the emission and the information notification. By way of a suitable implementation, for example portable computers or even high-performance computing units such as servers or the like, can be considered. For example, the transmission of information can be performed via internet or other ways of transmission to a computing center, or to other computing units. For such purpose, for example one or several anchors can provide a corresponding connection, for example a network connection. It is also possible to provide a corresponding transmission unit, which is added to the system temporarily, or for longer time periods, and which transmits appropriate data to the computing unit, and advantageously also receives them back and notifies them to the system or respectively to the objects. Advantageously, at least for one, particularly for all, location- and/or orientation- and/or distance measurements at least one probability is determined. In relation to the probabilities, the above statements apply. Advantageously, even a distribution of probability is determined. Advantageously, one most probable location/orientation/distances, respectively a distribution of probabilities for location, orientation and/or distance of at least one anchor, particularly of the system or respectively all the anchors and/or objects is determined. Here also, various calculation methods are possible. This is of advantage, particularly, when several anchors are being used, which also are able to determine their relative and/or absolute positions. In such a case, not all the measurements will be absolutely consistent, since measurement errors are inevitable. By introducing probabilities or respectively distributions of probabilities, a consistency can be achieved and a particularly good and probable determination or even map can be generated by simple means.

Advantageously, for the installation and/or calibration and/or temporarily for controlling, adjusting and/or correction, at least one additional anchor, particularly with absolute position-determination means, or with a known absolute position, can be incorporated into the system. Here, especially when the system itself does not provide any absolute position-determination means or only provides imprecise absolute position-determination means, or when a corresponding infrastructure for an absolute position determination is not available at the location of the system, or is available only insufficiently, an absolute position determination of at least one anchor, or respectively of the system can be performed by temporarily adding at least one additional anchor. This for example is suitable or necessary or advantageous when the absolute position of a system of anchors or of one anchor is to be determined and such anchor or anchors are located in an area, where a sufficient GPS reception is not possible. In such a case, one or several temporary anchors can be added, which are installed outside and/or which equipped with sufficient GPS reception, or respectively infrastructure supply, and can be used for absolute position determination. This is how for example in the installation of such a system in a building, temporary anchor points can be provided in front of the building, or respectively on top of the building, and can temporarily be integrated into the system. If then the relative position of the anchors, including at least one temporary anchor, in relation to each other is determined, and the absolute location of the temporarily added anchor is also determined, the absolute location of those anchors can be determined, which do not provide any absolute position-determination means or which cannot put them to sufficient use. Subsequently, the temporary anchors can be removed. For example, it is also possible to use temporary anchors with a particularly high emission- and/or computing power, in order to couple them into the system, even if they are far away from it, or respectively, corresponding obstructions are located in between, and, if desired, in order to take over computing tasks of other components. Such process can also be suitable, if anchors of the system do provide absolute position-determination means, and if a corresponding infrastructure is available, the supply for which, however, is relatively bad, such that accurate position determinations are not possible at all, or over time intervals of insufficient duration only.

This method can also be used in combination with a method which also works with probabilities or respectively distributions of probabilities, and particularly, where a distribution of probabilities of the locations and/or orientations and/or distances of the anchors of the system is elaborated. Advantageously in an inventive method for distance-, location and/or orientation determination of at least one object and/or anchor, the distance modification, or respectively modification of the phase shift due to the distance modification between object and at least one anchor is determined between the individual transmissions, or respectively, between the individual signals, and is taken into account in such distance determination. In distance measurements on the basis of the phase location problems arise when the objects move in relation to each other, because slight modifications of the relative location already can lead to relatively major modifications in the phase shift. If the speed of an object, or respectively the relative speed between object and anchor is determined, and if such speed in particular is substantially constant, an interpolation can be performed for successive signals or measurements, such that the modification of the phase location, which is due to the movement, can be calculated and/or corrected for (e.g. subtracted), and thus additional ambiguities or contradictions in the determination of the location and/or distance can be avoided or corrected for. This can be done, for example, as has been thoroughly described in general terms for two objects in other parts of the present application. Of such two objects, one for example can be an anchor.

Advantageously, for distance- and/or location determination of at least one object and/or anchor, the following method steps can be performed at least two times: emitting of a first signal from the first object, receiving of the first signal at the second object, emitting a second signal from the second object, receiving of the second signal at the first object, determining a frequency difference between the frequencies and providing the result to an evaluation means, determining a first phase difference between the first signal at the first object and the second signal at the first object, determining a second phase difference between first signal at the second object and second signal at the second object, wherein the determined phase- and/or frequency differences are being used for determining the distance. This is how a distance determination with particularly simple objects and anchors is possible, which are de-coupled with reference to phase, frequency and substantially to time. This renders a particularly simple installation of objects and/or anchors possible.

Advantageously, for distance-, location- and/or orientation determination of at least one object and/or anchor, at least partially, two signals with different frequencies are emitted from one anchor, particularly from one anchor, particularly simultaneously, where particularly the different frequencies are in a known relation to each other. By means of such a method, distance measurements can be performed particularly fast and reliably, particularly avoiding problems which occur due to relative movements. This is how a particularly fast system can be installed which is unsusceptible to relative movements.

In an embodiment, which in some application scenarios would be a preferred embodiment, from at least one object and/or anchor for distance-, location- and/or orientation determination at least partially phase-correlated signals are emitted, particularly from one anchor, particularly on different frequencies, particularly with a known frequency relation, particularly simultaneously or in close succession to each other. In such a system, which is more complex to be realized, distance measurements on objects/anchors can be performed particularly fast and particularly reliably.

In another embodiment, for the distance-, location- and/or orientation determination of at least one object and/or anchor, at least partially two phase measurements are carried out, and the difference of the frequencies of the two signals and of the measurements of the phases of the two signals, particularly the beat signal are being used for the distance measurement. Here, the two measurements are performed particularly with signals which are emitted successively, particularly with different frequencies, and particularly in a known frequency relation. The signals are particularly emitted from one or two different anchors. Such an embodiment of the system makes an arrangement possible, which is relatively unsusceptible to relative movements. However, such a system is much more complex to be implemented.

The individual embodiments of the systems with different signal sequences and correlations can be combined as desired. Particularly, different signal-return runs can be implemented with different embodiments. It is also possible to adapt the type of implementation to the current situation in the system, e.g. movement and/or interference.

Advantageously, at least one auto-correlation matrix, which is elaborated from measurement values of at least one signal, can be used together with an array response from reception devices of an object and/or anchor, which array response was calculated or measured by way of calibration. This is how by way of projection, the direction of incidence, the polarization and/or phase, respectively curvature of one or several waves can be determined on parts of a signal. By using array response and auto-correlation matrix in such a way, as well as by means of their projection, the required computing time for the corresponding calculation of distance, locations and orientation can be substantially reduced. Furthermore, based on the multiplicity of information used, the measurement can be performed much more accurately.

Advantageously, the object can also emit at least one signal and then phase measurements on the signal emitted by the object can be performed at at least one anchor. Advantageously, at least one pair of mutual phase measurements, that is for example a measurement at an anchor A of a signal of the object, and a measurement at the object on a signal of the anchor A, is provided to the evaluation means. Advantageously, all the pairs are provided correspondingly to one or several evaluation means. Evaluation means can also be arranged in the object and/or an anchor. By adopting such course of action, and based on the use of the information gained, particularly by way of using the pairs of mutual phase measurements, it is possible to determine distances and/or a distance map very quickly and reliably, and also the absolute distances between such pairs can be determined. In this way, the signals of the anchors and the phase measurements as performed at such anchors, can be used twice. Furthermore, also, a relatively low power only is to be applied by the object for the emission, because it does not need to emit a separate signal to each anchor, but the distances of the object in relation to each anchor can already be determined directly, by means of one emission of the object and corresponding phase measurements at at least one anchor, with the aid of the phase measurements which have been performed. This can particularly be performed according to the method of EP 2196823. Owing to the additional measurements, also the calculations of distance differences are simplified as compared to a method with a passive object.

The invention is also solved by means of a method for the operation of an anchor network, wherein the presence of all the anchors and/or the unchanged location and/or orientation of all the anchors is regularly verified. Such verification can be performed by means of different method steps or means. For one, regular measurements of the distances, respectively orientations and locations, of the anchors can be performed. On the other hand, the anchors themselves can provide suitable sensors for recognizing a modification of the location/orientation themselves.

Such analysis, which can also refer to the question, whether the individual anchors are still present in the system, respectively whether they still work failure-free, is of advantage, because otherwise there is a risk of unnoticed error measurements, which could occur relating to the distance or location and/or orientation of objects or anchors.

It also is of advantage, to arrange the method for operation of an anchor network in such a way that the distances and/or locations and/or orientations of the anchors are verified and/or corrected regularly and/or continuously. This is suitable for example, when an absolutely stationary positioning of the anchors is not given. It can also be suitable, when the transmission paths or respectively obstructions change. Usually, an absolute stationary location and orientation of the anchors cannot be guaranteed, if only due to thermal expansions, such that a regular correction usually is of advantage in an accurately working system.

The invention also is solved by means of an anchor for the performance of an inventive method. Such an anchor provides at least emission means for the emission of a signal. This applies to every first anchor only. All the second and further anchors in addition have to provide appropriate phase-measurement means and means for the transmission of information in relation of the phase-measurement. Furthermore, at least one anchor or one device has to be arranged such that the location- or position information of the anchors can be provided to a computation unit, especially an object, unless they are not provided to such a computation unit, especially object, in any other way, such as by being stored at/in such computation unit/object, for example.

Advantageously, an anchor provides means for the detection of a location- and/or position change and/or of vibrations. Such means could be GPS sensors or vibration sensors for example, as well as other types of suitable location-, orientation-, acceleration- and position-detection means and/or means for location- and position change or respectively for the detection of vibrations.

The invention is also solved by means of an object for the performance of or respectively participation in an inventive method or anchor network. Such object provides at least one reception means and one device for the measurement of phase. It might include a computation unit. Furthermore, it provides means for the reception of additional information, or respectively provides information on the location of anchors, e.g. on a storage medium or means to make available the phase measurement to an external computation unit. The object could for example be a commercial mobile telephone which is equipped for performing the method. The reception device could for example be the antenna which is provided in the mobile telephone anyway. The mobile telephone usually also provides computing power and memory to store information.

By providing suitable further equipment, software and/or respectively by refitting or installing mobile telephones, numerous objects can be created in a simple process, such that numerous applications for such a system exist, particularly, because people usually carry mobile telephones. This is how their location or orientation can be determined, and particularly, corresponding information, in accordance with their current position, such as for example information relating to navigation or to the environment, such as for example advertisement, can be provided to them.

The object is also solved by means of a system for the performance of an inventive method. Such system usually provides at least one, particularly two, three or more anchors. In such a system, several appropriately equipped objects can determine their position or respectively location and/or orientation. Such objects can then also notify their location and/or position or orientation. Such a system might also provide one or more computation units and means for making available information.

The object is solved also by using the inventive method, anchor, object and/or system for the implementation of location related advertisement, navigation and/or for localization, particularly when an emergency call is made, particularly from an inventive object, particularly from a mobile telephone.

The advantageous features of the method can also be implemented in the devices, in the use and the system accordingly.

Further advantageous embodiments can be developed by the person skilled in the art by providing adaptations to the respective requirements. Further aspects of the invention shall be described by means of the purely schematic, and non-descriptive drawings, as follows below.

The invention is combinable with the following aspects to generate further advantageously effects, e.g. improve the accuracy, speed and reliability. Those aspects might constitute separate inventions by themselves or in combinations with other aspects, especially as pointed out below.

Especially this invention is combinable in the following ways to form preferred embodiments realizing synergistic effects.

In the following, exemplary possibilities of application of the invention, which provide particular advantages, shall be described:

The described invention can be combined with one or several of the following inventions A, B and C with synergistic effects. Here, the anchors and/or the objects of the invention represent objects of the inventions A and/or B. They can also represent emitters and receivers of invention C. Advantageously, an object of the invention represents a receiver of invention C, and an anchor of the invention represents an emitter of invention C. Special advantageous effects will be described by way of example in the following. A multiple use of the signals according to more than one invention is in most times possible and advantageous. Examples are described below.

Further, the inventions A and B can be combined with each other with or without the above described invention without any problems, in order to obtain further improvements. This is how an accurate distance measurement can quickly be achieved, especially of moving objects which are far apart from each other. In such process, any desired signal and any desired number of signals of invention A can also be used for the method steps of invention B and vice versa, provided they fulfill the respective described conditions. They can as well be signals/emissions of the above described invention. Also, signals can be used, which are used according to one of the inventions only. The sequence is basically optional.

It is also possible that both or one of the inventions A and B are being used in combination with invention C with or without the above described invention, which is how the accuracy can be enhanced. Here, the emitters and receivers of invention C can be objects of invention A and/or B. Concerning the multiple use of the signals, the same as explained above applies accordingly. Particularly in the case of moving objects, a combination of those inventions can be suitable, in order to better detect the movement and to be able to carry out appropriate corrections correspondingly. Here, portions of movement along the connection line between the objects can be detected especially by inventions A and B, and such portions of movement in transverse direction can be detected particularly by invention C.

MODE(S) FOR CARRYING OUT THE INVENTION

Figure 1:
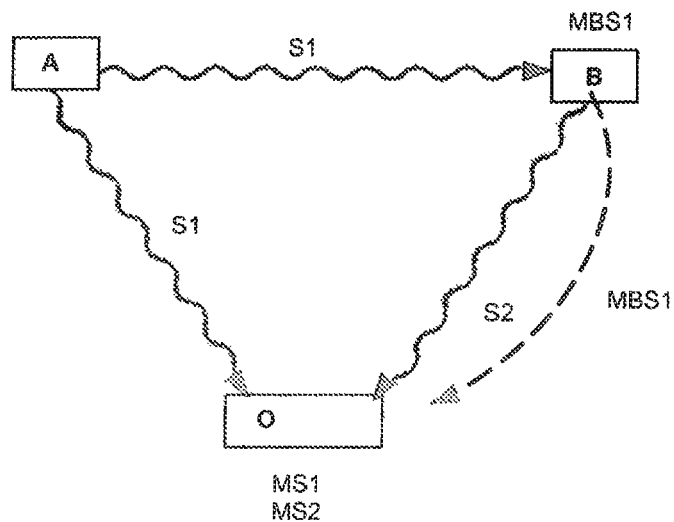
FIG. 1 View of an anchor system consisting of two anchors in interaction with an object.

FIG. 1 shows a drawing of an anchor network with two anchors A, B and the interaction with an object O. The positions of the anchors A, B are known to the object O from the beginning on. At first, a signal S1 is emitted from anchor A which is received by the anchor B. Here, a phase measurement MBS1 of the signal S1 is performed. The signal S1 is also received at the object O. Here also a phase measurement MS1 of signal S1 is performed. Then anchor B emits a signal S2. It is received by the object O. Here, a phase measurement MS2 is carried out. In the following, anchor B transmits information on the phase measurement MBS1 on signal S1 to object O. Object O then can calculate the difference between the distance to anchor A and the distance from anchor A via anchor B to the object. This is how a difference between the distance of the object O from the anchor A and distance of the object O to the anchor B can be calculated. In combination with information on the position of the anchors A and B, thus a relatively unambiguous position determination can be carried out. This can be improved by using several anchors.

Figure 2:
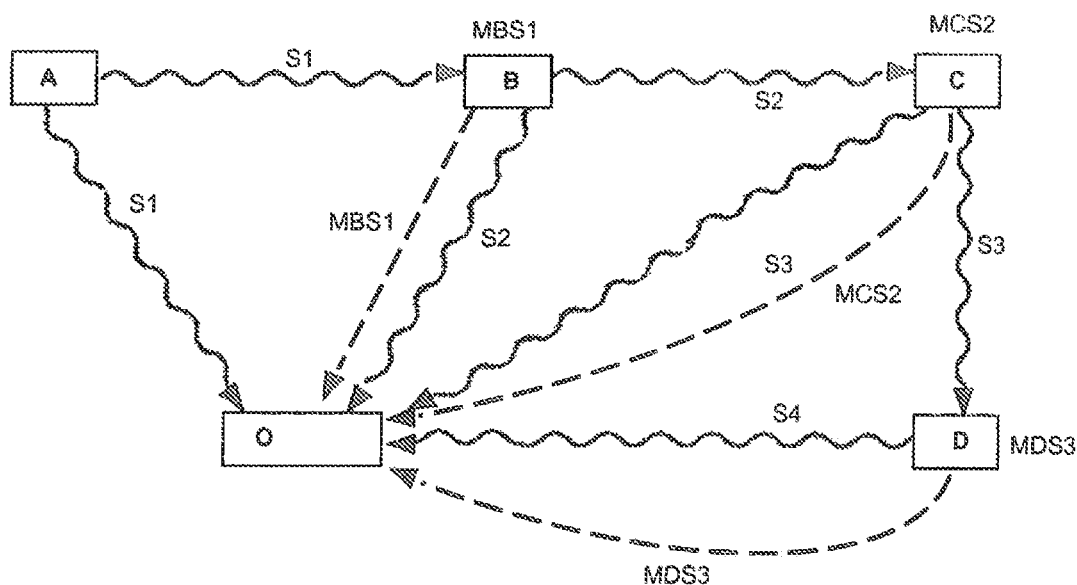
FIG. 2 A representation of an anchor system consisting of four anchors in interaction with an object.

Such a situation, in which a system with four anchors A, B, C, D cooperates with one object O, is shown in FIG. 2. Here, at first a signal S1 is emitted from anchor A and is received by anchor B as well as by the object O. Object O performs a phase measurement MS1, while anchor B also carries out a phase measurement MBS1. Thereafter, anchor B emits a signal S2 which is received by the object O and anchor C. Object O carries out a phase measurement MS2. The anchor C performs a phase measurement MCS2. Thereafter, anchor C emits a signal S3 which is received by object O and anchor D. Object O carries out a phase measurement MS3, while anchor D performs a phase measurement MDS3. Thereafter, anchor D emits a signal S4 which is received by object O. The object O carries out a phase measurement MS4. In the following, anchors B, C, D successively transmit their information on the phase measurements MBS1, MCS2, MDS3, as well as their locations to the object O. On such basis, the latter is able to determine the differences of the distances to the anchors. In combination with the information on the positions of the anchors A, B, C, D, which previously were made known to the object O, the position of the object O can thus be determined.

Figure 3:
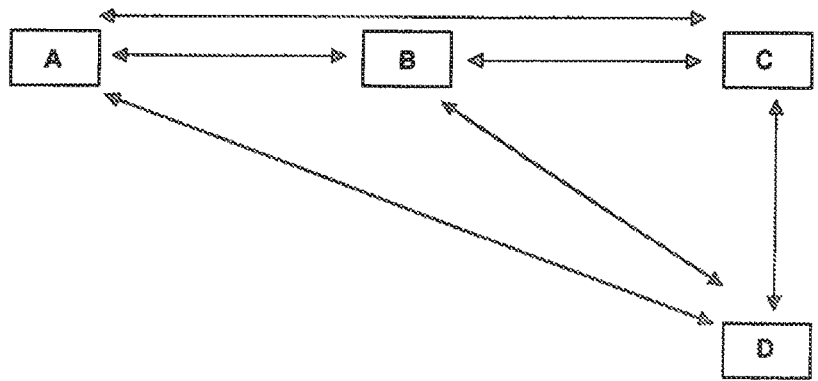
FIG. 3 Schematic illustration of a calibration of a system with four anchors.

FIG. 3 shows a schematic process of a calibration limited to the relative position of the anchors. The anchors A, B, C, D determine the respective distances, as shown by the double arrows. This is how their positions in relation to each other can be determined. Furthermore, the anchors A, B, C, D can also determine the respective orientation, or respective alignments to each other, and thereby increase the accuracy.

Figure 4:
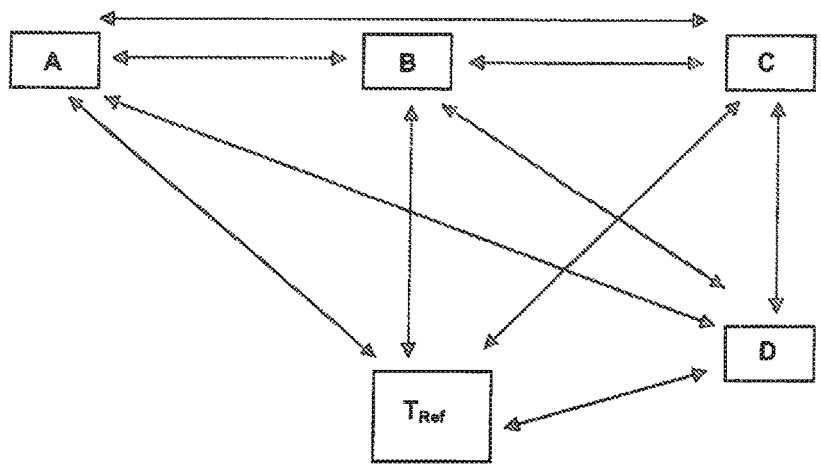
FIG. 4 A schematic illustration of a calibration of a system with four anchors and a temporary reference anchor.

FIG. 4 shows a calibration with a temporary reference anchor $T_{Ref}$. The temporary reference anchor $T_{Ref}$ is equipped with absolute position-determination means, here a GPS module. The anchors A, B, C, D constitute the regular system. The temporary reference anchor $T_{Ref}$ is inserted into the regular system only temporarily. The temporary reference anchor $T_{Ref}$ determines its absolute position, to where the anchors $T_{Ref}$, A, B, C, D respectively determine their distances with respect to each other. This is how the positions of the anchors A, B, C, D can be determined in absolute terms.

Figure 5:
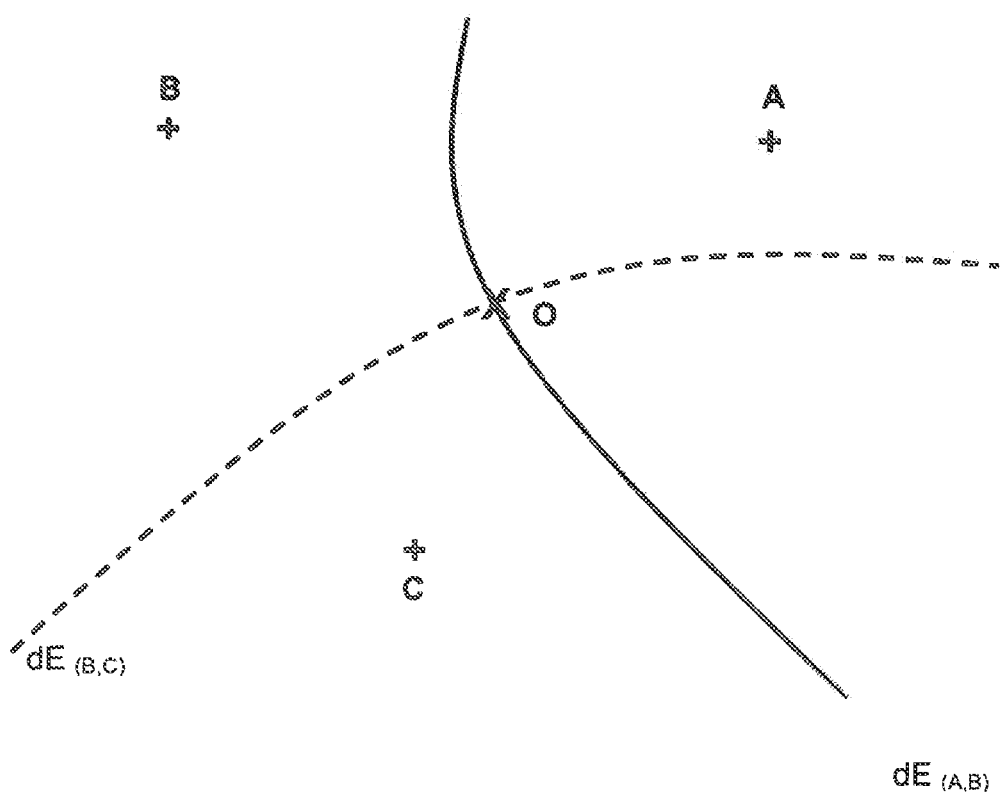
FIG. 5 Illustration of a position determination of an object in an anchor system consisting of three anchors.

FIG. 5 illustrates the position determination of an object O within a system with three anchors A, B, C after the determination of said distance differences. The determination can be resolved graphically as well as by way of calculation, by solving the corresponding equation system or by proceeding sequentially, by verifying all the points in an as accurate grid as desired, to whether or not the determined distance differences are fulfilled.

To represent this in a drawing, one can proceed as follows:
First positions of anchors A, B, C are marked. What is known is that the distance of the object O from anchor A is shorter by $dE_{(A,B)}$ than from anchor B. Therefore, one marks all the points (as $dE_{(A,B)}$ line) which fulfill such criterion. Further known is that the distance of the object O from anchor B is shorter by $dE_{(B,C)}$ than from anchor C. Therefore, one marks all the points (as $dE_{(B,C)}$ line) which fulfill such criterion. At the point of intersection, the object O is located.

LIST OF REFERENCE SIGNS

A First anchor
B Second anchor
C Third anchor
D Fourth anchor
O Object
S1 First signal
S2 Second signal
S3 Third signal
S4 Fourth signal
MBS1 phase measurement of the first signal at the object B
MCS2 phase measurement of the second signal at anchor C
MDS3 phase measurement of the third signal at anchor D
$T_{Ref}$ Temporary reference anchor
MS1 First phase measurement at the object
MS2 Second phase measurement at the object
MS3 Third phase measurement at the object
MS4 Fourth phase measurement at the object
$dE_{(A,B)}$ Line of constant distance difference between object and anchor A and object and anchor B
$dE_{(B,C)}$ Line of contrast distance difference between object and anchor B and object and anchor C
Invention A The invention relates to a method, device and system for the determination of a distance between two objects.

It is known to repeatedly perform phase measurements, on the basis of any desired basis frequency, and, in the process, to increase the frequency in discrete steps, particularly with a constant step size, and to thus exclude ambiguities, and to eventually obtain a distance-measurement value with a corresponding accuracy.

By means of such a method, particularly for stationary objects, theoretically measurements can be achieved, with a desired accuracy. However, this could require an indefinite amount of time. The object of the present invention is to provide a corresponding method which makes a relatively accurate measurement possible, even with short measuring times, and even with objects which are moving with respect to one another, as occurs in practical applications.

This should particularly also be possible, if the range to be covered is relatively high, particularly in comparison to the requirement of accuracy.

In the inventive method for distance measurement, the distance measurement is performed on the basis of transmitting, particularly electromagnetic, signals between at least two objects, and measuring phase angels at said at least two objects; in such process, from each of the at least two objects several signals are emitted and analyzed with reference to their phase angle. The signals are at least partially emitted with different frequencies. This process provides two stages:

In the first stage, at least one measurement with at least two emissions with a frequency difference between the successive emissions, particularly of one object, with frequencies of successive emissions with frequencies which have not yet been used during this stage, at least not by the emitting object, is performed. The frequency differences are selected from a start-measurement-frequency difference range.

That means that in the first stage, at least two emissions with a frequency difference between them are being carried out, and that the frequency difference is selected from a start-measurement-frequency difference range.

Thus, for example in a start-measurement-frequency difference range of 100 to 300 Megahertz and a start-measurement frequency of one Gigahertz, the second measurement can be performed at 1.2 Gigahertz.

In the inventive method, a selection of a measurement-frequency difference range is performed on the basis of such at least one measurement in the first stage. As measurement-frequency difference ranges, several measurement frequency difference ranges can be provided, for example 10 to 50 Kilohertz and 100-200 Kilohertz. The start-measurement-frequency difference range also can be a measurement-frequency difference range.

According to the invention, in the second stage, at least one measurement with at least two emissions, particularly of one object, with a frequency difference between the frequencies of the emissions of successive emissions with frequencies which in this stage have not yet been used, at least not by the emitting object, is performed.

Here the frequency difference between the measurements of successive emissions, carried out with frequencies which have not yet been used in this stage, at least not by the emitting object, lie within the selected measurement-frequency difference range.

For the selection of the measurement-frequency ranges, different criteria and collected data can be taken into account. Particularly, a kind of interval choice can be performed: If the approximate distance-measurement result of the first or of the preceding stage lies within an interval from A to B, a first measurement-frequency distance range is used, if the approximate distance-measurement result of the first or preceding stage lies in an interval between B to C, a second measurement-frequency distance range is used, and so forth.

For the emissions of successive emissions, as considered in the individual stages, with frequencies which have not yet been used in the stage, at least not by the emitting object, thus solely a criterion for the emissions is set, which are performed with frequencies which in that stage have not yet been used, at least not by the emitting object. If for example, first a measurement is performed in a stage at a frequency F1, followed by a measurement with the frequency F2, and after that by a measurement with frequency F1 and then by a measurement with frequency F3, then solely the frequency pairs F1, F2 and F2, F3 have to fulfill the criterion, that their difference of the frequencies respectively lies within the applicable start-measurement-frequency difference range or measurement-frequency difference range. Here, the emission with the repeated frequency F1 is left out of consideration.

In the selection of the measurement-frequency difference ranges, advantageously one measurement-frequency difference range is selected which with the given number of emissions in this stage provides an unambiguous distance range, which lies in the range of up to ⅕ to ½, particularly of up to 0.25 to 0.4, particularly of ⅓ of the previously measured approximate distance.

Advantageously, the measurement-frequency difference range is selected in such a way, that even when assumed errors or measurement tolerances are taken into consideration, such condition is clearly fulfilled.

Particularly, the measurement-frequency difference range is selected among those which fulfill said criterion, which offers the highest accuracy, meaning which offers the narrowest unambiguous range.

Ideally, in the case of measurement-frequency difference ranges, which contain several measurement-frequency ranges, the concrete measurement-frequency range is also selected correspondingly.

Accuracy will improve with more repetitions and larger measurement-frequency differences. Doubling the frequency difference between smallest and largest frequency will provide a doubling of the measurement accuracy.

However, the resolution is also very dependent on the phase-measurement accuracy, particularly the phase jitter.

The unambiguity interval increases along with otherwise constant conditions in the selection of smaller measurement-frequency differences. It depends on the difference of the frequencies used. In the case of two signals with different frequencies respectively, the unambiguity within one range is given as long as the phase difference, at any desired distance within the range is smaller than 360° between measurements with the two frequencies. Doubling the frequency difference between the two frequencies leads to cutting the unambiguity range in half. The following relation can be used: Ambiguity range=speed of light/frequency difference/2.

Using 10 emissions with a frequency difference of 3.5 MHz respectively, the unambiguity range amounts to ca. 40 m. With a phase jitter of 10°, a practical accuracy of ca. +/−0.3 m is achieved.

Using 10 emissions with a frequency difference of 750 kHz respectively, the unambiguity range amounts to ca. 190 m. With a phase jitter of 10°, a practical accuracy of ca. +/−1.4 m is achieved.

Using 10 emissions with a frequency difference of 130 kHz respectively, the unambiguity range amounts to ca. 1.1 km. With a phase jitter of 10°, a practical accuracy of ca. +/−8 m is achieved.

Advantageously, in case a selection of a measurement-frequency difference range should provide a measurement-frequency distance range which corresponds to the start-measurement-frequency distance range or to the measurement-frequency distance range of the preceding stage, the execution of further stages can be waved.

The number of stages used also depends on the number of different frequencies used. When 15-25 frequencies are used per stage, the application of two stages is preferable. If 6 to 15 frequencies are used, the application of at least 3 stages is preferable.

The emission of a signal can also be the modification of a wave field. In such an embodiment, which is advantageous particularly, when as an object, a RFID is integrated into the method, at first a signal can be emitted from a trigger object, which at the same time can also represent a first or a second signal.

The latter can be changed, respectively influenced by the object, particularly by the RFID. In such influence, at least partially an influence coming from the influencing object, in other words a signal coming from said object, can be recognized, which signal can be used as second or first signal respectively. One could also speak of a reflection of the signal which changes the wave field and represents a signal. As a rule, such change is in a known phase relationship with the original signal, which, where appropriated, can be dependent on the inclination of the polarization plains of the antennas to each other. This is how the method can be performed easily and efficiently, especially for short distances. The change as produced by the object takes place advantageously with an identification of the object or with an identification which identifies the object, particularly unambiguously. It is furthermore possible that an emission is performed by the object, with the use of energy from the wave field of the first emitted signal of the trigger object. The trigger object can be one of the at least two objects.

By way of such method, highly accurate measurements can be realized in a relatively short period of time and with little effort. By means of the first stage, particularly at first, a relatively rough distance value can be determined. Based on this, then in the second stage, this measurement can be enhanced. This is possible particularly owing to the fact that on the basis of the rough measurement, which advantageously is performed in the first stage, ambiguities can be excluded in the second stage.

As a matter of principle, any number of measurement-frequency difference ranges can be provided, advantageously, however, at least two measurement-frequency difference ranges are provided. Measurement-distance ranges can particularly be firmly predefined, and in other embodiments, depending on the operational mode, condition or other circumstances, they can also be generated, respectively determined dynamically. What solely matters is that after the first stage has been performed, at least two measurement-frequency distance ranges are available, from which, based on the measurement in the first stage, a selection can be carried out. This means that the selection of the concrete measurement-frequency difference range as used in the first stage, is performed with an optimization which is based on the distances which have been preliminarily determined in the preceding stage and/or stages and/or measurements. This means that not only the measurements from the preceding, particularly first stage can be used, but that beyond that, even further stages or measurements upstream of that one can flow into the decision of selection. Furthermore, advantageously also the measurement-frequency difference ranges available, from which the corresponding measurement-frequency difference range can be selected, are optimized on the basis of the distances as preliminarily determined in the preceding stage and/or stages and/or measurements. This leads to a particularly good result because it provides a further optimization of the amount of measurement-frequency ranges or measurement-frequency difference ranges respectively, from which the selection can be made.

Advantageously, this method is performed for distance measurement, between at least two objects. In such determination of a distance to be determined between two objects, the advantages of the present invention can be put to particularly good use.

A particular advantage is achieved based on the measurements of the first and second stages respectively, at least one new selection of a measurement-frequency difference range for performing at least one further stage is carried out. In the process, the results of any number of upstream stages and/or measurements can be used. At least the results of one upstream measurement and/or stage, however, should serve as basis for the selection of the measurement-frequency difference range to be used. In the at least one further stage, again at least one measurement with at least two emissions with a frequency difference between the frequencies of successive emissions with frequencies which have not yet been used in such stage, at least not by the emitting object, of particularly one object is performed. Here, the frequency differences lie within the newly selected measurement-frequency difference range. That means that, as previously described for the second stage, one further stage is performed. Any desired number of stages can succeed each other. Furthermore, measurement-frequency difference ranges which have already been selected, can be selected once again. It is also possible to provide different measurement-frequency difference ranges for different stages. By repeatedly performing several stages, the accuracy can be enhanced. Also, a repeated performance of several stages can be particularly advantageous, if the objects are moving in relation to each other, and if therefore their distance is changing.

The method is carried out advantageously such that the selection of the measurement frequencies of the emissions is performed in consideration of the selected measurement-frequency difference range, in consideration of interfering signals and/or transmission channels in such a way, that the clearest, most unambiguous and/or interference-free transmission of the frequency difference is guaranteed. That means that certainly the constraint of the frequency difference being selected from the measurement-frequency range needs to be guaranteed, but it also means that if such constraint is observed, the measurement frequencies can be selected such that the clearest possible transmission with the highest performance, as unambiguous and/or interference-free as possible is obtained. This is how interfering influences coming from other signals or from the environment, or multipathing effects can be avoided or reduced. For that purpose, for example the start frequency can be selected accordingly. Knowledge about optimum measurement frequencies can be gained from previously performed emissions or transmissions respectively, or by means of the reception of possible interference signals. Also further transmission parameters, such as the selection of particular antennas for example, can be performed accordingly, provided several antennas are available for the individual objects, in order to guarantee the optimal transmission of the signals.

The method can be performed advantageously in such a way that the selection of the measurement-frequency difference range is carried out from among measurement-frequency difference ranges of which one is equal to the start-measurement-frequency distance range. That means that the first stage is carried out with the start-measurement-frequency distance range, and that then, in the second stage, a selection from among the measurement-frequency difference ranges takes place, of which one is equal to the start-measurement-frequency difference range. This can be advantageous in the case of particular distance conditions.

Advantageously, at least one, particularly all frequency-difference ranges provide exactly one frequency difference respectively. That means that the measurement-frequency difference ranges actually do not represent ranges, but rather are measurement-frequency differences. The same holds true, advantageously, for the start-frequency difference range, for which advantageously a start-frequency difference is determined or will be determined respectively.

The method is carried out advantageously such that the start-measurement-frequency difference range or the start-measurement frequency difference is selected in such a way that an unambiguous measurement in the furthest distance range, in comparison to the other measurement-frequency difference ranges or measurement-frequency difference respectively, becomes possible. By way of such a selection of the start-measurement-frequency difference range or of the start-measurement frequency difference, already in the first stage an unambiguous rough measurement can be obtained in a maximum distance range, while excluding ambiguities. On that basis, then the selection of the next measurement-frequency difference range can take place and the measurement can be gradually determined by carrying out further measurements. In the selection of the measurement-frequency difference range, also an error which was determined in the measurement of the first stage and which occurred in the first rough distance measurement, can be taken into consideration in the first stage.

Advantageously, if inconsistencies or problems should arise in measurements following the first stages, another stage is performed with the start-measurement-frequency difference range.

Advantageously, a start-measurement-frequency difference range is selected, which provides an unambiguous distance measurement up to a distance of 30 m to 50 km, particularly 3 km to 5 km, particularly, 4 km. Such distance ranges usually correspond to the maximum range of such methods, which use electromagnetic signals in the range from 0.8 GHz to 6 GHz. This is how, in such a procedure, in the first stage, a rough distance measurement can be performed for the entire range. To put it into general terms, it thus is of advantage, to predetermine or use a start-measurement-frequency difference range or a start-measurement frequency difference which makes an unambiguous, if rough, distance measurement possible, which covers the maximum range that can be covered by the method/devices or needs to be covered for the task at hand.

Advantageously, the measurement-frequency difference ranges or measurement-frequency difference for different distance ranges are optimized. Here it is particularly advantageous, to provide at least one measurement-frequency difference range for distances of 30 to 50 m, one for 300 to 500 m, and/or one for 3 km to 5 km, as long as the range is sufficient. Particularly advantageously, at least one of the two objects performs intermittent emissions with at least one frequency, which has already been used in the current stage, especially by the emitting object. Here the frequency difference which has to be selected from the start-measurement-frequency difference ranges or the measurement-frequency difference ranges respectively, refer to the emissions from before and after the emissions with repeated frequency.

As previously explained, in the case of frequency repetitions in one stage, the frequency differences relating to the emissions which are being considered, which do not represent an emission with repeated frequency. If for example, the following emission sequence with the frequencies F1, F2, F3, F1, F4 is performed, only the frequency pairs F1F2, F2F3, F3F4 have to fulfill the condition that their frequency difference needs to lie within the corresponding measurement-frequency difference range or start-measurement-frequency difference range respectively. By way of such an intermittent emission with a repeated frequency, for example problems can be eliminated which occur in the distance determination, for example due to relative movements between the objects.

Advantageously, the intermittent emissions are performed with a repeated frequency at the end of each stage, particularly by the at least two objects. In such process, advantageously, the frequency for the intermittent emission with repeated frequency, as used in the beginning of the stage, particularly by the respective object, is being used. This is advantageous because it allows the determination of an average movement or of an averaged speed, respectively, between the start and the end of the stage. By way of interpolation, it thus becomes possible to approximately calculate the phase difference of the individual measurements, as changed by a movement, and this is how negative influences of the relative movement can be eliminated relatively easily and accurately.

Particularly advantageously, especially in case of very heavily moving objects, the intermittent emission with a repeated frequency is performed after each non-intermittent emission, particularly by the at least two objects. That means that every other emission, particularly every other emission of each object, is such an emission with a repeated frequency. For such purpose, particularly the frequency is used which has been used in the respective beginning of the stage, particularly by the respective object. This would lead to a frequency sequence F1 F2 F1 F3 F1 F4 F1. However, other sequences such as for example repeating the last frequency like F1 F1 F2 F2 F3 F3 are also possible.

Advantageously, each object, particularly all the objects, emit at any time only one signal. That means that from such objects, or from such object respectively, not several signals are emitted at one time. This increases the degree of unambiguity and accuracy of the measurements, because influences are avoided. In addition to that, only relatively simple constructions are required, because no arrangements for several emissions or simultaneous receptions respectively need to be provided.

Advantageously, the distance change or the change of the phase shift respectively, is determined on the basis of the distance change between the objects between the individual transmissions or emissions respectively and is taken into account in the determination of the distance.

Distance changes between the objects clearly influence the measurement on the basis of the phase information even in the case of a relatively short time interval. Thus relatively small relative movements between the objects already are suited to cause relatively severe changes in the phase angles. For this reason, it is advantageous, to detect the distance change or the relative movement of the objects respectively, and to take them into account when considering or respectively analyzing the phase information or when calculating the distance. For such purpose, different distance-change measurements or speed measurements respectively can be performed and/or interpolation is possible between the individual measurement or emission times respectively. Thus for example an assumption relating to the type of speed, particularly of a uniform movement, can be made, usually without having to accept inaccuracies which could be too important. In such a consideration, the distance measurement as such can be regarded as an average value of the individual measurements, or the actual distance at the point in time of the last measurement or emission can be analyzed. Advantageously, at least a part of the method is carried out in such a way that the following method steps are performed at least two times: emission of a first signal from the first object, reception of the first signal at the second object, emission of a second signal from the second object, reception of the second signal at the first object, determination of a frequency difference between the frequencies and provision of the result to an evaluation means, determination of a first phase difference between the first signal at the first object and the second signal at the first object, determination of a second phase difference between the first signal at the second object and the second signal at the second object. In such process, the phase differences as determined are used for the determination of the distance. Such method makes a distance determination with uncoupled objects possible, particularly uncoupled with reference to the phases, frequencies and, to the greatest possible extent, with reference to time. For that reason, the realization of the described method is particularly cost efficient, simple and sturdy.

Advantageously, at least partially two signals with different frequencies are emitted, particularly from one object. Here the different frequencies particularly are in a known relationship to each other. The emissions into the signals can be performed simultaneously, successively or particularly in a close time-related relationship. Such a method allows to avoid particularly problems which are caused by relative movements between the objects.

It is particularly advantageous, depending on the case of application, that, at least partially, phase-correlated signals can be emitted, particularly from more than one object, particularly on different frequencies, particularly with a known frequency relationship. This can happen particularly simultaneously or in a close succession after each other. Owing to such an at least partially phase-correlated emission, which can be performed with increased effort only, faster and more accurate measurements can be carried out. In particular, it is also possible to reduce the required calculation efforts, which are required in order to calculate a distance from the phase measurements.

Particularly advantageously, especially in a method at least partially two measurements, particularly with successively emitted signals, particularly with different frequencies are performed, wherein the frequencies particularly are in a known frequency relationship. Here the emissions of particularly two different objects are performed and the difference of the frequencies of the signals and the measurements of the phases of the two signals, particularly the beat signal, are used for the distance measurement. This is how especially problems can be avoided, which arise due to relative movements.

The task is furthermore resolved by means of a system comprising at least two emitter-receiver means, equipped to perform the method. The individual emitter- and receiver means can be of different types. For example, they can be mobile devices such as mobile telephones for example. A stationary device is another possibility. Furthermore, they can be part of a bigger system, particularly, of an anchor system for the position determination of mobile devices. This is how for example several anchors and one object can be provided and the distance of the object can be determined by different anchors.

Advantages of the inventive method can be used particularly advantageously in the use of the method and/or system for improving a distance measurement and/or determination of a relative speed between two objects. Such an application can be used for example in location- or navigation purposes or a similar application. A particularly advantageous use can be found for example in the localization of victims buried in an avalanche or located in a burning or otherwise dangerous building. The method and/or system can be put to a particularly advantageous use in a system for distance determination and/or localization, in which a high accuracy needs to be obtained in a short period of time, particularly over larger distance ranges.

The advantageous features of the method can also be realized accordingly, in a suitably equipped device, application or appropriately arranged system.

Figure 6:
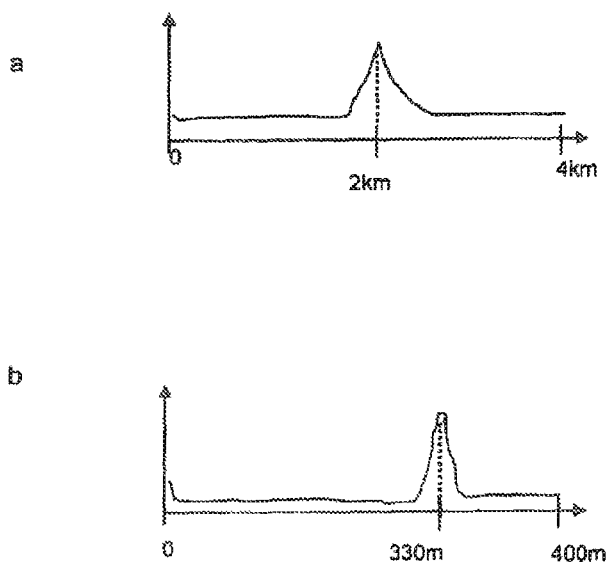
FIG. 6 A first representation of a first two-stage measurement method shown as 6a and 6b.

Further advantageous aspects of the invention can be found as adapted by the person skilled in the art to the particular case of application. Without therefore meaning a limitation, and in terms of a purely exemplary explanation, further aspects shall be explained on the basis of the following schematic representations. The figures show in detail as follows:

FIG. 6, a first representation of a first two-stage measurement method and

Figure 7:
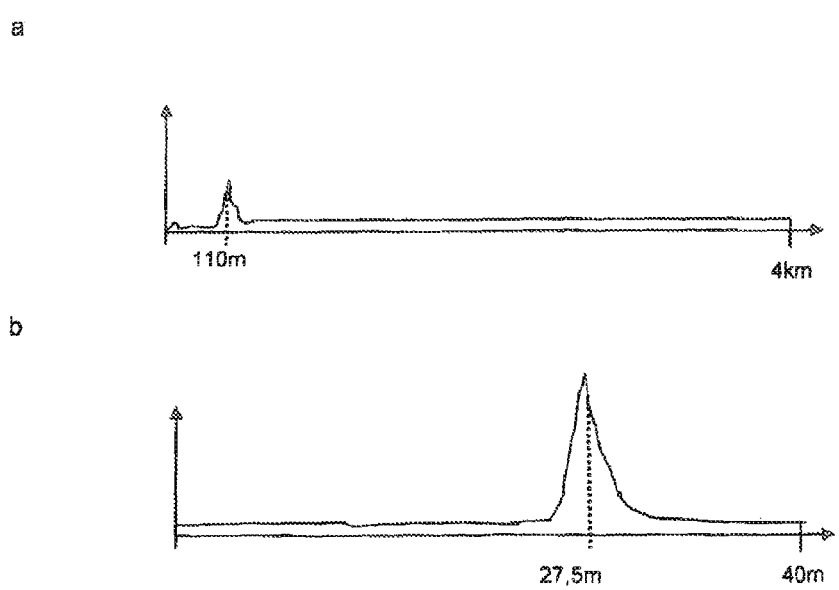
FIG. 7 A representation of a second two-stage measurement method shown as 7a and 7b.

FIG. 7, a representation of a second two-stage measurement method

FIG. 6a shows a distribution of probability of a distance determination on the basis of a measurement of the first stage, with an unambiguity range of 4 km.

What can be seen is that the most probable distance is at 2 km. Thereafter, in a second stage, the distribution of probability of which is shown in FIG. 6b, a distance is determined more accurately. For such purpose, an unambiguity range of 400 m is used, which is unambiguous relating to phase in a distance interval of 400 meters.

Here, the distribution of probability is at a maximum at 330 meters within the distance interval of 400 meters. Thus the most probable total distance can calculated to 1.930 meters. This is, because the distance interval of 400 meters has to be the one, into which fall the results of stage 1, that is, into which falls a distance from 1.6 to 2 kilometers. In the case of an unambiguous measurement interval of 400 meters, thus the intervals up to 400 meters, 400 to 800 meters, 800 to 1,200 meters, 1,200 to 1,600 meters and 1,600 to 2,000 meters and so forth can be relevant. The results of stage 1 therefore determines the interval to be the interval of 1.6-2 kilometers. The exact distance determination therefore is: 1.6 kilometers+330 meters=1.930 kilometers.

FIG. 7 shows the results of a second two-stage method. In figure A2a, the distribution of probability of the distance is shown based on the measurements in the first stage. The most probable distance amounts to approximately 110 meters.

On the basis of the results of the first stage, a measurement-frequency difference range is selected for the second stage, which at the given number of emissions is unambiguous in relation to phase in a distance range of 0 to 40 meters. The second diagram shows that the most probable distance within such distance interval amounts to 27.5 meters. The corresponding interval now has to coincide with the measurements from stage 1. Therefore, the ranges 0 to 40 meters, 40 to 80 meters, 80 to 120 meters, 120 to 160 meters etc. come into question. The relevant interval here therefore is the one from 80 to 100 meters, such that after a more accurate second stage, a total distance of 80 meters+27.5 meters=107.5 meters is obtained.

Invention a Comprises:

A1. Method for distance measurement, the distance measurement being performed on the basis of transmitting, particularly electromagnetic, signals between at least two objects and measurements of phase angels at said at least two objects, wherein from each of said at least two objects several signals are being emitted and analyzed with reference to their phase angel, said signals being at least partially emitted at different frequencies, said method being performed in at least two stages, wherein in a first of the at least two stages at least one measurement with at least two emissions with a frequency difference between frequencies of successive emissions with frequencies that have not been used in this stage, at least not by the emitting object, is performed, said frequency differences being selected from a start-measurement frequency difference range and selection of a measurement-frequency difference range on the basis of such at least one measurement in said first stage, wherein in a second of said at least two stages at least one measurement with at least two emissions with a frequency difference between frequencies of successive emissions with frequencies that have not been used in this stage, at least not by the emitting object, is performed, wherein said frequency differences are selected from the selected measurement-frequency difference range.

A2. Method wherein the selection of said measurement-frequency difference range is carried out from among at least two measurement-frequency difference ranges.

A3. Method wherein the selection of said measurement-frequency difference range and/or measurement-frequency difference ranges being optimized and performed on the basis of the difference which was preliminarily determined in the preceding stage and/or stages and/or measurement or measurements.

A4. Method wherein the distance measurement being performed between said at least two objects.

A5. Method wherein on the basis of said measurements and/or first and second stage at least one further selection of a measurement-frequency difference range is performed for the performance of at least one further stage, and at least one further stage is performed, and wherein in said at least one further stage at least one measurement with emissions with a frequency difference between frequencies of successive emissions, particularly of one object, is performed with frequencies which have not yet been used at least in said at least one further stage and at least for emissions from said emitting object, said frequency differences being selected from among the further selected measurement-frequency difference range.

A6. Method wherein the selection of said measurement frequencies is performed taking into consideration the selected measurement-frequency difference range as well as interference signals and/or transmission channels, such that the clearest and most distinct and/or interference-free transmission of the signals possible is achieved.

A7. Method wherein the selection of said measurement-frequency difference range is carried out from among measurement-frequency difference ranges, of which one is equal to the start-measurement frequency difference range.

A8. Method wherein the measurement-frequency difference ranges each comprise exactly one frequency difference respectively.

A9. Method wherein said start-measurement frequency difference range is selected such that it allows an unambiguous measurement in the largest distance range compared to the other measurement-frequency difference ranges.

A10. Method wherein said start-measurement frequency difference range allows an unequivocal distance measurement up to a difference of 30 m to 50 km, in particular of 3 km to 5 km, particularly of 4 km.

A11. Method wherein said measurement-frequency difference ranges are optimized for different distance ranges, particularly at least one measurement-frequency difference range for distances of up to 30-50 m, one for up to 300-500 m and/or one for up to 3 km-5 km.

A12. Method wherein, particularly from the at least two objects, at least one interim emissions with at least one frequency is performed, which frequency has already been used in the current stage, particularly from the emitting object, and wherein said frequency differences relate to the emissions from before and after the emission with repeated frequency.

A13. Method wherein the at least one interim emission is performed at the end of a stage, particularly from said at least two objects, particularly with the frequency used at the beginning of said stage, particularly by the respective object.

A14. Method wherein an interim emission is performed after each non-interim emission, particularly by said at least two objects, particularly with the frequency used in the beginning of said stage, particularly by the respective object.

A15. Method wherein said interim emission is performed at least partially with the frequency first used in the stage of the object, particularly with the frequency first used in the stage and/or with the frequency used immediately before the interim emission from the object, particularly immediately before the interim emission.

A16. Method wherein from each object, particularly from all objects, only one signal is emitted at any given time.

A17. Method wherein the change of distance or the change of the phase shift respectively is determined on the basis of the change of distance between the objects between the individual transmissions and is taken into consideration in the determination of the difference.

A18. Method wherein in each stage the following process steps are performed at least two times:
a) Emission of a first signal from a first object of said at least two objects
b) Reception of said first signal a second object of said at least two objects
c) Emission of a second signal from said second object
d) Reception of said second signal at said first object
e) Determination of a frequency difference between the frequencies and providing the result to an evaluation means
f) Determination of a first phase difference between said first signal at said first object and said second signal at said first object
g) Determination of a second phase difference between said first signal at said second object and said second signal at said second object
and wherein the phase and frequency differences as determined are being used for the determination of the distance.

A19. Method wherein at least partially two signals with different frequencies are being emitted, from particularly one object, wherein particularly said different frequencies are in a known relationship to each other.

A20. Method wherein at least partially phase correlated signals are emitted, particularly from one object, particularly on different frequencies, particularly with a known frequency relationship, particularly simultaneously or in close succession one after the other.

A21. Method wherein at least two measurements, particularly with successively emitted signals, particularly with different frequencies, particularly in a known frequency relationship, emitted from two different objects or from one object, are performed, and the difference of said frequencies of said two signals and of the measurements of said phases of said two signals, particularly the beat signal, are used for the distance measurement.

A22. System providing at least two emission and reception means, arranged for performing the method set out above.

A23. Use of the method and/or system to improve a distance measurement and/or determination of a relative speed between two objects.

A24. Use of a method and/or system in a system for distance determination and/or localization, particularly when a high accuracy is to be achieved over larger distance range.

Invention B

It is particularly known for distance measurements on the basis of phase locations, to realize movement corrections on the basis of several emissions which are performed simultaneously and on different frequencies from one object. Such process helps to avoid, owing to the two simultaneous measurements, that between the two measurements the distance might change and thus the phase measurement could be influenced by the relative movement.

This, however, requires synchronous emissions and simultaneous reception at the objects on different frequencies, which leads to an increase of the requirements of the respective objects or hard- and/or software respectively.

It therefore is an object of the present invention, to provide a correction of movement influences in distance measurement on the basis of phase angles which can do without simultaneously emitting several waves or several frequencies respectively.

The inventive method for the correction of a distance measurement between at least two objects, wherein the influence occurs due to a relative movement between said objects, is applied in distance measurements which are based on transmitting, particularly electromagnetic, signals between said objects, and in measurements of phase angels of the signals of such objects. In the process, each object, particularly all objects, emit only one signal at any one time. The distance changes or the changes of the phase shift respectively, based on the distance change between the objects between the individual transmissions is determined and is taken into consideration in the determination of the distance. This is for example, how, based on knowing the speed, the distance change between the individual measurements can be calculated or determined respectively, and thus the proportion of change in the phase shift can be determined, which is caused by the movement of the objects or by the relative movement between the objects, respectively. This is how all the measurements can be translated to a hypothetical distance at any (one) desired point in time during the measurements, or how all the phase angles, respectively shifts, can be corrected correspondingly. Here, a multiplicity of measurements at one point in time are feigned, without requiring a multiplicity of measurements at the same time. Thus, the method is carried out in such a way that a multiplicity of different measurements at different points in time can be referred to one individual point in time or to one individual measurement respectively, and thus the problem of relative movement can be eliminated.

Further, sometimes assumptions on the type of movement can be made, and thus the number of measurements or the required computing effort respectively, can be reduced. For example, a uniform or a linearly accelerated or a decelerated movement respectively, can be assumed. This holds true within the time frame of a distance measurement consisting of several measurements or respectively transmissions and phase-angle determinations, relatively often, without major approximation losses. In such a case, for example the change of the phase shift can be given as distance times frequency change times a constant plus the result of the distance change times two, divided by the wave length.

On the basis of such a relationship, the change of the phase change due to the relative movement can be eliminated. Also, the speed, or respectively distance can be determined by a corresponding transformation and by carrying out appropriate measurements. Here, the distance change constitutes the product of speed and the period of time passing between the individual measurements.

Advantageously, the individual emissions are performed by a first and a second object and the distance between said first and said second object is determined. Alternatives are conceivable, wherein, for example, a first and a second object emit and thereby form an anchor network for example, and where a reception is carried out by a third object, and the distance determination or measurement respectively, is e.g. also carried out at the third object.

The emission of a signal could also be the modification of a wave field. In such an embodiment, which is advantageous, particularly if a RFID is integrated into the method as an object, at first a signal can be emitted from a trigger object, which can constitute a signal according to the process, or respectively an emission according to the process at the same time.

Such signal can be changed, particularly influenced, by the object, particularly by the RFID. In such influence, at least partially an influence coming from the influencing object, that is a signal coming from said object, can be recognized, which can be used as second, respectively as first signal. One can also speak of a reflection of the signal which changes the wave field and constitutes a signal. Such change usually is in a known phase relationship with the original signal, which, where appropriate, can depend on the inclination of the polarization plains of the antennas to each other. This is how the method can be carried out simply and efficiently, especially for short distances. Here, the change caused by the object, is performed advantageously with an identification of the object, or respectively with an identification identifying said object, particularly unambiguously. Furthermore, it is also possible, that an emission by the object is performed, with the use of energy from the wave field of the first emitted signal of the trigger object. The trigger object can be one of the at least two objects.

In order to improve the accuracy and/or to avoid ambiguities in the evaluation, further information can be used on the movement and/or speed. For such purpose, for example suitable measurements can be performed, particularly on the objects and by the objects, or respectively, appropriate measurement means can be provided. This could be for example acceleration sensors (inertial sensors), or respectively acceleration measurements, or the like.

Advantageously, frequency measurements are performed at the objects. This increases the available number of items of information, or respectively increases the accuracy of basically firmly pre-defined frequencies, which however, can be slightly changed, for example due to temperature drift.

By means of corresponding frequency measurements or respectively the determination of a frequency, or respectively a Doppler-shift the speed of the relative movement can be determined, and on such basis, the distance change can be determined. This can serve as basis for a method according to the present invention, in which, based on the Doppler-shift, a relative speed, or respectively a distance change is determined, and thus the respective change of the phase shift is determined, and thus the influence of the movement on the distance determination is eliminated.

Additionally, or as an alternative, particularly from each object of the at least two objects, more than one signal with the same frequency can be emitted. This takes place chronologically off-set, one after another. By means of the repeated emission on one frequency, the influence of the phase shift due to the relative movement can also be eliminated. This can be easily recognized, for example, if in the above-mentioned equation, a frequency difference of zero is used. Then the change of the phase shift equals the distance change between the measurements, multiplied by 2 and divided by the wave length. This was based on the assumption, that the wave length for both measurements is identical, since with an identical frequency and an identical medium, an identical wave length can be assumed. As a rule, both measurements will be conveyed by the same medium, such that one identical wave length can be assumed. If the change of the phase shift is measured, this allows to determine the distance change. If also the time between the two measurements is known, this necessarily allows to conclude the relative movement of the objects.

Advantageously, always each of the at least two objects emits a signal one after the other. Based on the fact that the objects emit alternatingly or respectively in a pre-given order, a particularly reliable and accurate method can be put into reality.

Furthermore, advantageously, at least one, particularly each of the at least two objects emits at least partially every n-th, particularly every second, signal with repeated frequency. By carrying out a repeated emission with a repeated frequency, it is possible to determine relatively accurately a speed or respectively a speed distribution over time, and thus an inventive correction of the measurements (during that time) can be performed. Here, interpolations can be carried out with different methods, models and assumptions. This is the case particularly, when no uniform movement can be assumed.

Advantageously, the time intervals lying in between the individual emissions for an emitting object, particularly for all objects, are identical and particularly constant. This makes a particularly simple coordination of the emissions and a constant resolution possible, even, and particularly in the case of objects which do not provide a uniform movement.

Advantageously, the phases of the emitted signals are not coupled, particularly the signals are not phase-coherent and/or frequency-coupled. With respect to time, at least a certain synchronization will set in, due to the course of the process and the coordination of the emissions, which synchronization, however, for the purpose of a distance measurement based on the transit time, will be much too inaccurate.

This renders the construction of simple devices for performing the inventive method possible and also simplifies the performance of such method, since synchronization steps are not required.

Particularly advantageously, more than three signals with the same and/or different frequencies and with time intervals, are emitted by at least two objects.

Advantageously, from each of said objects, more than three signals with the same and/or different frequencies and with time intervals are emitted. Here advantageously, the ratio between said time intervals, between said signals and the frequency change between the signals, is not the same between all the signals of one object, particularly not between more than three signals of all the objects. Particularly, the ratio for each of the more than three signals of an object, particularly for each of the more than three signals of all the objects, is different. Here the time interval towards the preceding or following signal can be used. If such different ratios are selected, particularly relevant information can be generated and thus a good movement correction can be obtained.

If for example, a first emission with a frequency F1 is performed at a time T1 and a second emission at a time T2 with a frequency F2, as well as a third emission at a time T3 with a frequency F3 and a fourth emission at a time T4 with a frequency F4, the relations of (T2-T1):(F2-F1) and (T3-T2):(F3-F2) and (T4-T3):(F4-F3) are to be considered. Also relations (T3-T1):(F3-F1), (T4-T1):(F4-F1), (T4-T2):(F4-F2) can be considered.

Also other sequences could be used, for example:

Emission of a first signal at a time T1 and with a frequency F1, emission of a second signal with a frequency F2 at a time T2 and emission of a third signal with a frequency F1 at a time T3. With the assumption that the difference between the times T1, T2 and T2, T3 are identical, different ratios are obtained. By using suitable combinations, different requirements can be covered.

Thus for example, by repeating the first frequency, for example after n measurements, for example after each measurement with a different frequency, a particularly good movement correction can be achieved, however, at the detriment of the measurement speed or respectively of the high number of measurements or respectively repetitions to be performed. In order to be able to perform a faster measurement, a different type of repetition with identical time intervals can be selected. For example, each measurement can be repeated, before switching over to a different frequency. Also, by using suitable sequences of different frequencies, particularly efficient sequences are possible. Thus, for example, in measurements, switches from positive to negative frequency steps are conceivable. Such as, for example, a measurement with a first frequency, F1, and a following performance of a measurement F2 with a frequency identical to F1 plus two times ΔF, and a succeeding performance of a measurement with a frequency F1 plus, ΔF is particularly efficient. Such jumps which can be realized for example by way of a sequence of, increase the frequency by an amount for the performance of the second measurement as against the first measurement, decrease the frequency after that by a smaller amount for the performance of the next measurement, increase the frequency again correspondingly by a relatively large amount and decrease it once again by a smaller amount", provide significant advantages in terms of the efficiency of the repetitions and terms of the quality of the correction. This method can, for example, also be performed with opposite algebraic signs, where for example the frequency is lowered. Also a reversal with reference to the size of the steps is conceivable. By way of such jumps, such as for example go up more, go down less, for example two up, one down, a particularly efficient frequency sequence can be guaranteed.

Advantageously, all the time intervals are identical, such that the changes are obtained solely by way of the changes in the frequencies of the emitted signals. This makes a particularly simple timing of the method possible, and at the same time, a particularly positive avoidance of ambiguities of the phase measurements can be realized. Also the calculation effort is particularly simple in such case.

Particularly advantageously, a method wherein the Doppler shift of said signals is determined, on which basis the speed of the relative movement is determined, on which basis the distance change, respectively the change of the phase shift due to the distance change, is determined; and a method wherein from said at least two objects more than three signals each are emitted with identical and/or different frequencies and with interposed time intervals between the signals and wherein the ratio between said time intervals and the frequency changes between said signals is not the for all the signals of one object, particular for all objects, in particular is different for each of the more than three signals one object, particular of all the objects or a method wherein time intervals, particularly all time intervals, are identical are performed in chronological sequence after each other, particularly repeatedly. This is how the individual advantages of the determination of the influence of the phase shift due to the movement can be combined. Thus, for example the determination based on the Doppler-shift is imprecise in comparison, but relatively simple and fast to perform on the other hand, since a repetition of an emission is not required. On the other hand, a determination based on a method wherein from said at least two objects more than three signals each are emitted with identical and/or different frequencies and with interposed time intervals between the signals or where these time intervals are identical; on the basis of a repeated emission with a different relation between the time interval and the frequency difference is relatively precise, however, requires also a repetition and thus a relatively high amount of time. This is how, for example, at first a determination based on the Doppler-shift can be carried out, in order to obtain an initial value, or respectively a rough assessment of the relative movement, which then can be refined by way of the above two other methods.

Advantageously, the distance determination is performed in such a way that the following method steps are carried out at least two times:

Emission of a first signal from the first object, reception of the first signal at the second object, emission of a second signal from the second object, reception of the second signal at the first object, determination of a frequency difference between the frequencies and provision of the results to an evaluation means and determination of a first phase difference between the first signal at the first object and the second signal at the first object, as well as determination of a second phase difference between the first signal at the second object and the second signal at the second object, wherein the phases determined and the frequency differences are being used for the determination of the distance.

By way of such method, a relatively uncomplicated process can be realized, with completely de-coupled systems.

The invention is also solved by way of a reception means, particularly an emission and reception means, arranged to perform said method with an adequate equipped further emission and/or reception unit. For performing said method, at least one emission unit and one reception unit are required. Advantageously however, on both sides emission- and reception units are provided. Such units, particularly reception means, at least comprises means for emitting or respectively receiving, particularly electromagnetic, signals, as well as a measurement means for phase angles and a corresponding computing unit.

The object is also solved by means of a system providing at least two objects, equipped for performing the inventive process.

The object is also solved by way of using a method and/or system or respectively a reception means for improving a distance measurement on the basis of a phase measurement, particularly for objects which are moving in relation to each other.

This can be put to particularly advantageous use in localization devices for mobile use, particularly in rescue operations, in which rescue units are moved towards helpless persons to be localized, sometimes with high speed, such as for example in helicopters, and in the process have to depend on being able to perform already in the approach a relatively accurate localization of such persons or of the objects which identify these persons respectively, or of the emission- and/or reception devices identifying the person.

Figure 8:
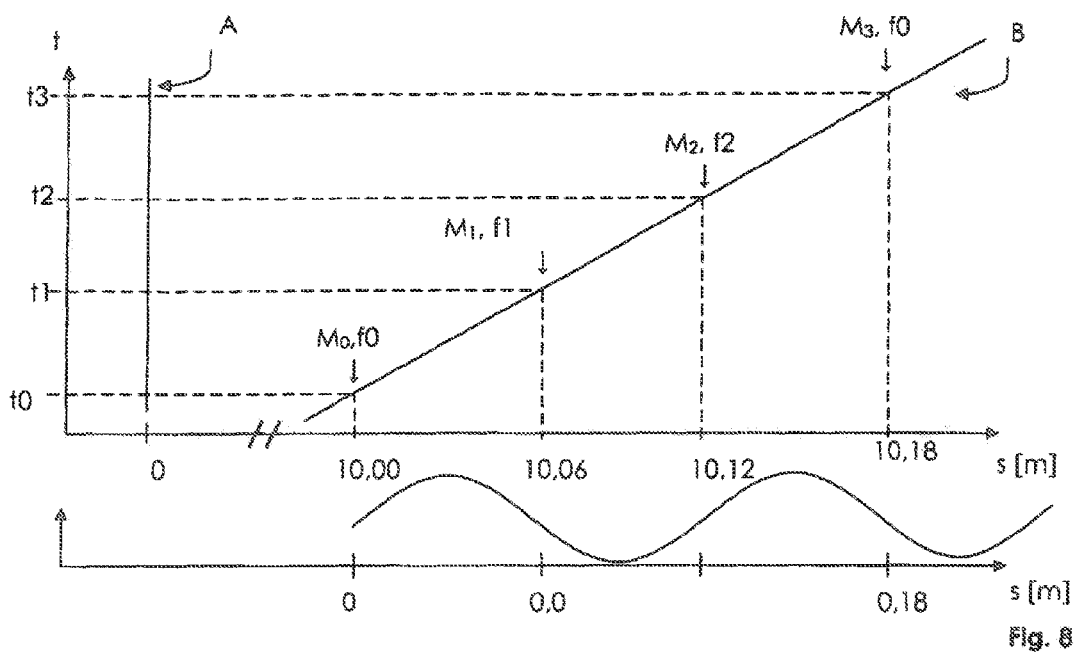
FIG. 8 A schematic view of the process of measurement with moving objects.

Further adaptations of the inventive solution to the respective problem can easily be found by the person skilled in the art. In terms of mere examples, without constituting a description, a few aspects shall be shown in the following, on the basis of the purely schematic figures, without any limiting effect. The figures show in detail as follows:

FIG. 8 a schematic view of the process of measurement with moving objects.

Figure 9:
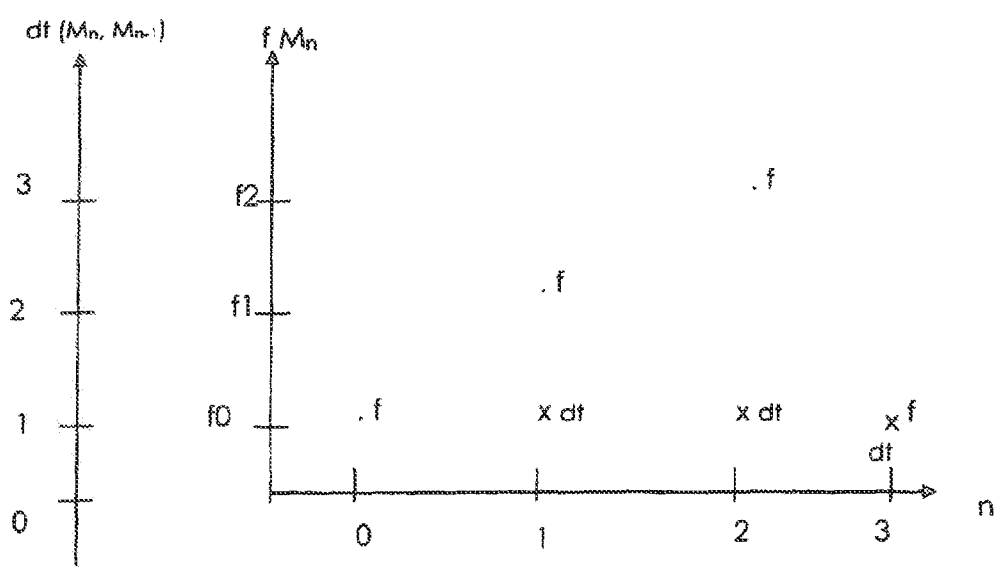
FIG. 9 A representation of the different measurements, their frequencies and time differences.

FIG. 9 a representation of the different measurements, their frequencies and time differences.

Figure 10:
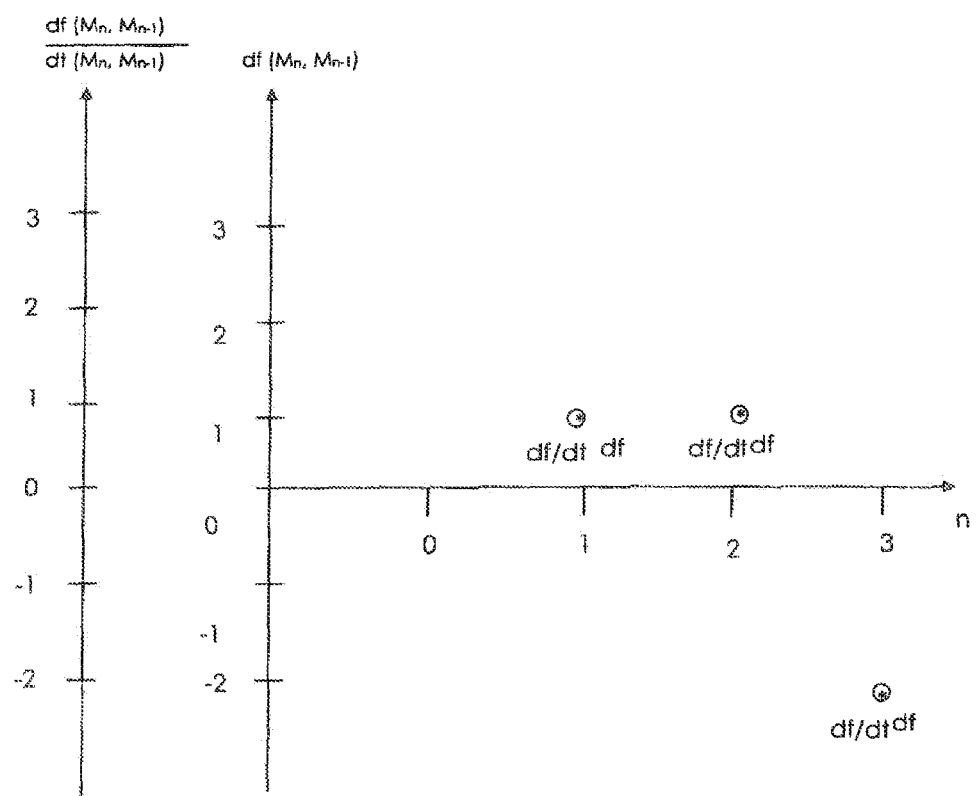
FIG. 10 A representation of the different measurements and their frequency differences and the ratios between the time differences and frequency differences.

FIG. 10 a representation of the different measurements and their frequency differences and the ratios between the time differences and frequency differences.

FIG. 8 shows a graphic illustration of the process of a measurement. What can be seen is the time between measurements, shown against the distance between the objects A and B. The straight lines represent the positions in dependence on time. Here, the reference system was placed into object A, such that its position amounts to a constant zero. The distance of the object B from object A increases with increasing time. The slope of the straight line represents the speed of the relative movement. The individual measurements M0 to M3 are marked with the frequencies F0, F1, F2, F0 at the points in time T0 to T3. Below, a wave-train is placed, with a wavelength used for the measurement. Its frequency amounts to 2.4 GHz. The first measurement starts at a relative distance of 10 meters at the time T0 with the frequency F0. Then follows the measurement M1 with frequency F1 at time T1 and thereupon the measurement M2 at time T2 at the frequency F2. Eventually, measurement M3 is carried out at time T3 with the repeated frequency F0. The time period between the measurements at T0, T1, T2, T3 are identical respectively. Thus, the time difference between successive measurements $dt(M_n, M_{n-1})$ is constant.

What can be seen is that already the relatively small distance change in a range of centimeters leads to a clear change of the phase angle in the individual measurements.

FIG. 9 and FIG. 10 show the differences of the frequencies, as well as of the times between two measurements, as well as their ratios. What is shown, as against the index of the measurements, is the frequency difference, time difference, as well as their ratios to each other in arbitrary scales, on own axes respectively. Furthermore, what is represented on an own axis, are the frequencies of the individual measurements. What can be seen is that by selecting the measurement frequency and measurement times, partially different ratios of the frequency differences to the time differences are given. Here, only the relations of frequency differences and time differences of successive measurement are shown. For completion, in addition, also the respective relations of the measurements M2 to M0, M3 to M0, as well as M3 to M1 could be shown or used for analysis respectively.

LIST OF REFERENCE SIGNS FOR FIG. 8-10 t0 Time of the first measurement
t1 Time of the second measurement
t2 Time of the third measurement
t3 Time of the fourth measurement
M0 First measurement
M1 Second measurement
M2 Third measurement
M3 Fourth measurement
F0 Frequency of the first measurement
F1 Frequency of the second measurement
F2 Frequency of the third measurement
F3 Frequency of the fourth measurement
A movement of the first object
B movement of the second object
t time
s distance
df frequency difference
dt time difference
n index of the measurement
Invention B Comprises:
B1. Method for the correction of an influence to a distance measurement between at least two objects, providing a first and a second object, wherein said influence originates from relative movement between said at least two objects, wherein said distance measurement is performed on the basis of transmission of, particularly electromagnetic, signals between said at least two objects, and measurements of phase angles of the signals are carried out at said first and second object,
wherein from each of said at least two objects, particularly from all objects, at any given time only one signal is emitted, wherein the distance change and/or the change of the phase shift due to the distance change between said objects is determined between the individual transmissions and is taken into consideration in the determination of the distance.

B2. Method wherein the distance measurement is carried out between said first and said second object.

B3. Method according to B2, wherein only two objects participate.

B4. Method wherein at said first and said second object frequency measurements of the signals are carried out.

B5. Method wherein the Doppler shift of said signals is determined, on which basis the speed of the relative movement is determined, on which basis the distance change, respectively the change of the phase shift due to the distance change, is determined.

B6. Method wherein particularly from each of said at least two objects more than one signal with the same frequency is emitted.

B7. Method wherein each of said at least two objects successively emits one signal.

B8. Method wherein at least one, particularly each of said at least two objects temporarily emits every n-th, particularly every second, signal with a repeated frequency.

B9. Method wherein emissions with time intervals being interposed there between are performed and time intervals, particularly all time intervals, are identical.

B10. Method according to wherein the phases of said signals are not coupled, particularly not phase coherent.

B11. Method wherein from said at least two objects more than three signals each are emitted with identical and/or different frequencies and with interposed time intervals between the signals and wherein the ratio between said time intervals and the frequency changes between said signals is not the for all the signals of one object, particular for all objects, in particular is different for each of the more than three signals one object, particular of all the objects.

B12. Method according to B11, wherein time intervals, particularly all time intervals, are identical.

B13. Method wherein the method set out in B5 and B11 are performed successively, particularly are performed repeatedly.

B14. Method wherein in each stage the following method steps are performed at least two times:
 a. Emission of a first signal from a first object of said at least two objects
 b. Reception of said first signal at a second of said at least two objects
 c. Emission of a second signal from said second object
 d. Reception of said second signal at said first object.
 e. Determination of a frequency difference between the frequencies and providing the result to an evaluation means.
 f. Determination of a first phase difference between said first signal at said first object and said second signal at said first object
 g. Determination of a second phase difference between the first signal at said second object and the second signal at said second object
 h. and wherein the phase and frequency differences as determined are being used for the determination of the distance.

B15. Reception device, particularly emission and reception device, arranged for the performance of the method set out above with a further accordingly equipped transmission and/or reception device.

B16. System providing at least two objects which are equipped for the performance of the method set out in B1 to B14.

B17. Use of the method and/or system B1 to B16 to improve a distance measurement on the basis of a phase measurement.

B18. Use according to B17, in localization of devices, particular for mobile use, particularly in rescue operations.

Invention C

Several different possibilities are known, to determine locations and directions by analyzing signals. This can be performed for example by means of rotating receiving directional antennas. It is also known to evaluate the signals from several statically arranged reception devices.

Furthermore, it is also known, to subject the received waves to a decomposition, particularly a Fourier decomposition and to obtain information on the direction of incidence and the source of the signals by mathematical means.

It is known particularly, to use for such purpose an array response of the used reception device arrangement. An array response indicates which signal is to be taken from the reception device arrangement, when a certain radiation impacts onto the receiving device arrangement.

Accordingly, an array response can be calculated or can be generated by way of calibration. An array response either is a function or consists of a number of objects. An array response, as a function, is an allocation between the properties of an incident wave (frequency f, direction of incidence (alpha, phi), polarization, wave-front curvature, field strength) and the signals delivered by the individual reception devices which usually are represented as complex numbers. Thus, such a function in most cases constitutes a complex function of several variables.

As a quantity of objects, the array response consists of a quantity of array-response components, which respectively constitute particularly vectors of the signals delivered by the individual reception devices. These vectors are allocated to a combination of forms of at least one property (for ex. Frequency, amplitude, direction) of an incident wave.

That means that such a vector usually contains as many complex figures, as reception devices are provided. The array response then is composed of a multitude of such vectors for different manifestations of properties of the incident wave, such as for example frequency and direction of incidence. If for such purpose, based on the conditions, it is sufficient to take the parameters f, phi and alpha into consideration, then an array response could be a complex vectorial function of the form A (alpha, phi, f). If here, the array response consists of individual vectors, it could consist of the set of the complex vectors $A_{alpha(k),phi(l),f(n)}$. Wherein k, l, n constitute natural indices, indicating different angles in the range of for alpha [0;360[ and for phi[0;180[ and frequencies f. If one works, for example, with frequencies in the range from 1 to 10 Hertz and if one wants to cover the entire space and achieve a resolution of delta f=1 Hertz and delta phi=delta alpha=6°, the array response consists of 10×60×30=18 000 vectors. These vectors are vectors of the measurement values, and thus of complex numbers (amplitude and phase), and provide the dimension s, where s constitutes the number of reception devices.

Furthermore, it is known, to form the matrix M from the measurement-value vectors m containing the complex measurement-values of the reception devices (amplitude and phase) of several measurements i wherein the measurements are measurements of uncorrelated signals or de-correlated measurements (for ex. measurements on different frequencies), the i columns of which Matrix M form the $m_i$ measurement-value vectors. From such matrix M then the auto-correlation matrix $AKM=E(MM^H)$ is calculated, where $M^H$ constitutes the complexly conjugated transpose of M, and E(M) constitutes the normal of M. From such AKM, Eigen vectors EV and Eigen values EW can be calculated. Based on the Eigen values, it is known, to attempt to separate noise from signal. Also further analyses of the AKM, for example on the basis of the inverse, are known. The results are then referenced to the array response, in order to thus conclude what are the (probable, approximated) characteristics of the wave field at the reception-device arrangement.

For example, the signal portions which remain after separation of the noise portion on the basis of the Eigen values (sub-space) are compared to the array response.

Furthermore, it is known, to use an array response which consists of 2N×2M dimensional matrices. Here, N constitutes the number of reception devices and M the number of the modes which were taken into consideration in the decomposition. The size of the matrix 2N is obtained, because the used antennas respectively provide two exits for different polarization directions of the incident radiation.

Furthermore, it is known, to use pluri-dimensional array responses and to thus save storage space and computing time. This is possible, if the problem can be approximately partially de-coupled. Here, the array response contains at least a 2×s dimensional object, which in the first line indicates, which signal is to be taken from the reception-device arrangement, when an electromagnetic radiation which is polarized in a first angle incides onto the reception-device arrangement, and indicates in the second line, which signal is to be taken from the reception-device arrangement, when an electromagnetic radiation which is polarized in a second angle, incides onto the reception-device arrangement, wherein each column indicates, which signal is to be taken from one of the s reception-device arrangements. The 2×s dimensional object depends on at least one characteristic of an incident wave, or is allocated to a manifestation of at least one characteristic of an incident wave. Here, s>=2 and s is the number of reception devices.

That means that the array response is a 2×s dimensional matrix function, that is a matrix, the individual 2×s values of which respectively depend on at least one characteristic of an incident wave, or can be a quantity of 2×s dimensional matrices. In the latter case, the individual matrices of the array response are respectively allocated to a combination of the manifestation of at least one characteristic of an incident wave.

That means that instead of the known array response as a vectorial function or as a quantity of vectors, a set of matrices (at least 2×s) or a matrix function (at least 2×s) shall be applied.

E.g. by means of the polarization angles p1 and p2, spaces are defined, which in the present two-dimensional case constitute planes. This can be represented as follows: The array response is a quantity of 2×s dimensional matrices, for example the quantity $A_{alpha(k),phi(l),f(n)}$, of the 2×s dimensional complex matrices, where k, l, n constitute natural numbers and the different angles of the direction of incidence indicate alpha [0;360[ and phi[0;180[ and frequencies f (different manifestations of the characteristics frequency and direction of incidence). Here, each $A_{alpha(k),phi(l),f(n)}$, however, constitutes a matrix of 2×s complex numbers, where the complex numbers indicate the amplitude and phase of the measuring values of the a reception-device arrangements.

If the matrices are selected such that they provide two lines and s columns, the matrices in the first line for example take up the complex responses of the s antennas upon incidence of a wave which is polarized in the angle p1, and in the second line take up the complex responses of the s antennas, upon incidence of a wave which is polarized in angle P2.

The distance calculation between measurement values, or objects and array response calculated or generated on such basis, can for example be performed by way of a projection of measurement values, or of objects and array response calculated or generated on such basis, which does not necessarily need to be mathematically accurate, in order to obtain practically suitable results. Here, the matrix can for example be the auto-correlation matrix AKM of measurement values. This matrix defines a space. The space, however, also can be reduced to a sub-space. This is particularly suitable, when for example by way of known methods, noise components are to be removed from the signal. In such process it is recommendable to determine the Eigen vectors of the AKM, and on that basis, to identify the Eigen vector space, and to use of such space one sub-space (Eigen vector sub-space) only. In such process, it is of particular advantage, if the Eigen vectors with small Eigen values are neglected.

All these methods, however, have in common that direction of incidence or positions of only a limited number of emitters can be determined in a given time interval.

Therefore, it is an object of the invention to provide a method, system and a device as well as a use, by means of which an easy position determination of as many devices, as desired, particularly of pure receivers is possible within a short time interval.

The inventor has found that a position determination for mobile emitters on the basis of emission power radiated by the emitters is problematic. Therefore, according to his findings, a position determination of receivers is preferable, at least under certain circumstances.

He has found surprisingly, that it is possible to solve the envisaged problem by means of an emission characteristic of an emitter, instead of an array response of a receiver device.

According to the invention, at least one emission-device arrangement (emitter) is used with at least two emission devices and/or at least one emission device which between the emissions is spatially repositioned and/or reoriented, and at least one signal sequence is emitted by the emission-device arrangement. The signal sequences respectively contain at least two signals which are emitted within a signal sequence via different emission devices and/or from/at different positions and/or orientations.

Particularly, at least two de-correlated signal sequences are emitted. This makes reliable measurements possible, even if several propagation paths between emitter and receiver exist (multipathing), and thus also in more complex environments.

Since the individual emission devices or emission locations and/or orientations within a signal sequence differ from signal to signal of one signal sequence, the signals of one signal sequence emitted via the emission devices/locations/orientations are not equally distributed over the space.

The properties of the emitted waves at the receiver, respectively their ratios, such as for example phase ratios between signals of a signal sequence, depend on the propagation direction. In such process, particularly the relative phase of the signals of the at least two emission devices change over the points of reception (where the receiver is located), particularly in dependence of the angle between on one hand the emission devices, or respectively of the line connecting them, and on the other hand the receiver (angle of propagation) as well as the frequency of the signals.

If the at least two signals at the receiver can be distinguished (e.g. by an offset in time), a phase difference can be calculated between the signals, and based on the knowledge of the phase relation at the time of the emission, a path difference, and on that basis, particularly when the distance of the emission devices is known, an emission direction of the signals to the receiver and thus a direction of propagation can be determined, in which, from the emitter's perspective, the receiver is located.

Advantageously, the emissions are performed chronologically after each other, at least partially chronologically off-set, via different emission devices. This makes a clear separation of the signals possible.

The emissions via an emission device of several signal sequences, however can advantageously be performed simultaneously. Thus for example one first emission with a first frequency of a first signal sequence can be simultaneously performed with a first emission of a second signal sequence with a second frequency which is different from the first frequency, via a first emission device. Subsequently, for example, one second emission with the first frequency of the first signal sequence and one second emission of a second signal sequence with the second frequency, which is different from the first frequency, can be performed simultaneously via a second emission device.

By using at least two de-correlated signal sequences, a direction of propagation can also be determined, if several propagation paths are possible, for example due to reflections in the environment. A de-correlation, for example, can be performed by means of the change of the frequency of the signals as compared to the preceding or respectively to the other signal sequences. Also, for example, a de-correlation via the place of the emission devices or respectively of the emission-device arrangement is possible, by means of a modification of the polarization and/or of the transmission medium.

At least two, particularly all the signals of a signal sequence provide, when emitting, a known phase relation to each other within the signal sequence, and preferably provide one common frequency. A signal sequence can be emitted with all its signals separately and/or (partially) simultaneously.

For this purpose, for example one output of an oscillator between two emission devices can be switched between or be applied to several emission devices simultaneously. A frequency change which partially is located in between, for example a doubling before one or several emission devices has no negative effect.

The inventor furthermore found that in practical applications problems can arise due to the mutual influencing of the at least two emission devices, even in the case of an emission which is chronologically separated in a signal sequence, through the emission device. Such cross-talk can be further influenced or caused by additional components. This regularly leads to the signals not being clearly separable, or respectively undergoing additional phase shifts, which deteriorates the envisaged purpose, many times even making it impossible. Here, the mutual influences usually are dependent on polarization and/or frequency. In such process, as the inventor has found, particularly the inclination of the polarization plane(s) of the receiver in relation to the polarization planes of the emission devices substantially influence(s) the signals which can be measured at the receiver. Particularly, the frequency dependency, however, can often be neglected in the relevant measurement range.

Based on the knowledge of an emission characteristic in dependence of at least the propagation direction, through which the necessary information on the emission devices or respectively emission-device arrangement, such as for example the effects of its distance, can be taken into account. Thus on a receiver which only has to provide one reception direction, under certain circumstances, the projection direction of the signals received by the receiver can be determined.

Here the emission characteristic indicates a representation which shows which signals can be received at the receiver, when known signals are being emitted. In such process, the representation is dependent of the propagation direction of the signals, the orientation of the emission-device arrangement and of the receiver, as well as, if appropriate, of the frequency, as well as, if appropriate other properties of the emitted signals and the orientation of the emitter and receiver, such as for example the amplitude of the signals.

Here, the emission characteristic is usually determined or respectively indicated as a set of, particularly complex, matrices. In such process, particularly one matrix respectively indicates the emission characteristic which is effective in a propagation direction/angle. The set of matrices thus also determines the accuracy of the projection-direction resolution. However, also a pluri-dimensional complex function is possible. Each matrix itself, or respectively the pluri-dimensional complex function usually provides two elements, particularly two columns, which indicate the signals generated in dependence of the emission devices, the signals to be received for different polarizations, particularly polarization planes which are vertical to each other, or respectively inclinations of the receiver to the emission devices, or respectively, their polarization planes. The individual values here usually are complex numbers, which indicate amplitude and phase.

Particularly, in at least two lines, the matrices or function indicate(s) values for the individual emission devices. If the matrices for example provide two lines, in one matrix the first line for example indicates the relevant values for an emission via the first emission device and the second line for a second emission device.

The matrices or respectively pluri-dimensional functions can furthermore be dependent on additional parameters, particularly on the frequency.

Here, an emission device is to be considered in abstract terms. It can also consist of the combination of several antennas.

To determine the projection direction, two or more signal sequences each showing de-correlated signals can be emitted via the emission-device arrangement. In such process, respectively at least two of the signals of a signal sequence are emitted via different emission devices or emission-device combinations.

For the selection of the number of emission devices, it is important to keep in mind that a well-balanced proportion to the number of measurements of different signal sequences which are summarized into one measurement-value matrix at the receiver should be reached. Here, for example, the use 20 to 40, particularly 32 emission devices s, especially antennas, and 5 to 25, particularly 8 to 16, measurements n of the signal sequences which are respectively emitted via the emission devices s.

What is preferred is to perform the distance calculation by way of projection between the Eigen-vector (sub) space of the auto-correlation matrix AKM and the emission characteristic. The use of the Eigen-vector space of the AKM, or preferably of a suitable Eigen vector sub-space, that is a sub-space of the Eigen vector space, as already described above, is of particular advantage, because this is how negligible signal portions such as for example noise or ghost signals, can be suppressed in a simple way. A distance calculation by way of projection is particularly advantageous, because it is feasible within a relatively short calculation time, preferably even in real time. Here, by way of the projection also a nearest component of the emission characteristic can be determined in a simple way, which then allows to conclude the propagation direction/angle.

Preferably, based on the Eigen values calculated from measurement values, a calculation of at least relative upper power limits can be performed for wave-field portions.

It is preferred to determine the components of the emission characteristic, or respectively, the propagation directions, which fit best with the Eigen vector, and which make the emission-characteristic function as equal to the Eigen vector as possible, that is for example the local minima of the projection. Then, these components of the emission-characteristic are represented as linear combinations of the Eigen vectors, in other words, they are decomposed according to the basis of the Eigen vectors. Then the complex numbers in the lines (linear coefficients) indicate the portions of the Eigen vectors in the components of the emission characteristic. Particularly, in such type of standardization of the AKM and of the emission characteristic, where the sum of the squares of the EW amounts to 1, upper performance limits can easily be calculated as follows, modifications are possible for the person skilled in the art: the proportions are formed out of EW and the square of the associated linear coefficient are formed. This is how for every emission characteristic one set of proportions is obtained which indicate the relative upper limits for the power of the wave-field portions in consistence with the emission-characteristic component. Since these are upper limits, understandably only the smallest proportion needs to be taken into consideration.

This way to proceed is particularly advantageous, because in reality, the Eigen values often drop substantially, in other words, there are few larger Eigen values, as compared to the other Eigen values. This is how it is possible to determine in a simple way, which propagation directions should be considered in the further. In such decision, also the knowledge of the resolution capacity of the emission-device arrangement can play a role.

It is particularly economical in terms of calculation time and storage space, to use the emission characteristic in an orthogonalized form.

It is of particular advantage, to perform the distance calculation by way of projection of the emission characteristic into the space or into a sub-space of the auto-correlation matrix. This is how distances can be gained in a simple way. On such basis, then propagation direction and/or orientation can be determined. For such purpose, at first, the emission-characteristic component is determined which approximately matches the measuring values (minimum distance) (among other things, noise inhibits an exact match). On such emission-characteristic component then the properties can be determined, because each emission-characteristic component is allocated to a propagation direction and particularly also to an orientation.

Corresponding to the inversion of array response to emission characteristic, as shown here, all the advantageous features in the use of an array response, particularly those described in the introduction, can be transferred to the use of an emission characteristic.

Advantageously, at least two emission-device arrangements are used according to the invention. Then, at least two propagation directions can be determined by one receiver. This allows to determine a location of the receiver in way similar to triangulation. A system consisting of at least two emission-device arrangements can also provide one common emission characteristic, in which the emission characteristics of the individual emission devices or individual emission device arrangements are at least partially summarized and/or aggregated.

By means of a system with at least two emission-device arrangements or a system with one emission-device arrangement and additional position- and/or orientation- and/or direction-determination means, receivers can determine their position at least in relation to the emission-device arrangement, or their location can be determined at least in relation to the emission-device-arrangement.

Advantageously, such systems provide means for the determination of the relative and/or absolute locations and/or orientations of their emission-device arrangements and/or emission devices to each other, as well as means to monitor them with respect to function and/or location, orientation.

Advantageously, also the absolute location and/or relative location of at least one emission-device arrangement in relation to a building blueprint or a reference point is known and/or provides at least one device with at least one emission-device arrangement and means for the determination of such a position. Advantageously, such devices provide means for monitoring their location and or their modifications.

Advantageously at least two emission devices, particularly all emission devices of one emission device arrangement are located in close proximity, particularly within one housing. Particularly the distance between them is small compared to the distance to the receiver, particularly not larger than one meter, especially not larger than 50 cm.

Advantageously different emission device arrangements being part of a system or network are spaced apart by a distance larger than the distance between the emission devices of one emission device arrangement, especially by factor of at least 10, especially at least 50.

Advantageously the emission devices of a system or network of emission arrangements are not all located on a straight line.

Particularly, theoretically an infinite number of receivers can determine their location simultaneously, particularly without having to make it or their presence known.

The at least one emission characteristic here can also be stored in the receivers or can be notified to them. For such purpose, also the signals themselves can be used. Furthermore, also a transmission of the, where appropriate, pre-treated measuring values of the at least one receiver to an evaluation device is possible for determination. The evaluation device knows the at least one emission characteristic and/or it has been notified of it.

As receivers, particularly appropriately equipped mobile telephones can be used which usually already come with (parts of) the requisite hardware.

Particularly, the already existing antenna can be used for reception. Computing power and memory usually is also already provided in the mobile telephone.

By means of the appropriate equipment or respectively refitting or respectively installation of mobile telephones, numerous objects can be created in a simple way such that numerous applications for such a system exist, particularly because people carry mobile telephones on them and thus their location or respectively orientation can be determined and thus they can be provided with suitable information tailored to their current position, such as for example information relating to navigation or to the environment, such as advertisement, can be provided.

The problem is also solved by way of a use of the inventive method, device and/or system for the performance of location related advertisement, navigation and/or localization, particularly when an emergency call is made, particularly originating from an inventive object, particularly a mobile telephone.

The advantageous features of the method can also be realized advantageously in correspondingly equipped devices and systems and in corresponding uses.

Figure 11:
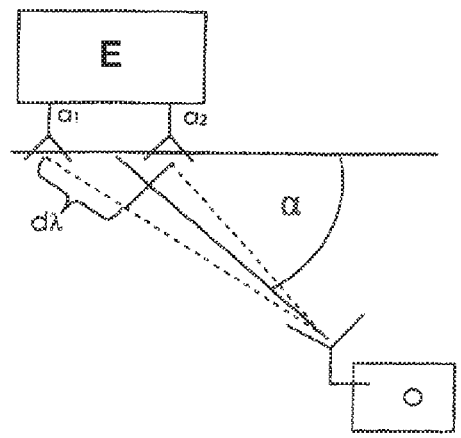
FIG. 11 A schematic view of an emission-device arrangement when emitting two signals to a receiver, with a first propagation direction.
Figure 12:
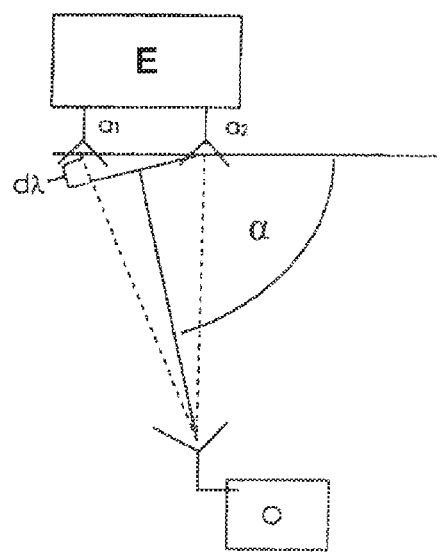
FIG. 12 A schematic view of an emission-device arrangement when emitting two signals to a receiver, with a second propagation direction.

FIG. 11 a schematic view of an emission-device arrangement when emitting two signals to a receiver, with a first propagation direction FIG. 12 a schematic view of an emission-device arrangement when emitting two signals to a receiver, with a second propagation direction FIG. 11 shows an emission-device arrangement E with two emission devices a1 and a2. Also, a receiver O can be seen. Furthermore, the connection line between the emission devices a1 and a2 are marked as a reference for the angle determination for the propagation direction, or respectively for the propagation angle $\alpha$. The signals out of a sequence of signals, emitted by the emission devices, are emitted into the space depending on the emission characteristic of the emission devices over a wide angle range. However, the figure shows only the direct signal path between the emission devices a1 and a2 and the receiver O, via which only a small portion of the emitted performance is transmitted.

Based on the different distances from the receiver O to the individual emission devices a1, a2, a phase shift $d\lambda$, of the signals emitted with a known phase relation is obtained at the receiver O. This can be measured at the receiver. This is how a propagation angle $\alpha$ can be determined. Such determination, however, is not unambiguous enough when there are two signals under multipath-propagation conditions, to determine the projection angle $\alpha$. For that purpose, at least two signal sequences are necessary.

FIG. 12 shows the emission-device arrangement E with two emission devices a1 and a2, as well as the receiver O of FIG. 11. The receiver O, however, is located in a different propagation direction, such that, as compared to FIG. 11, a different phase shift dA is obtained.

LIST OF REFERENCE SIGNS FOR FIG. 11-12

E Emission-device arrangement
a1 First emission device
a2 Second emission device
O Receiver
$\alpha$ Projection angle
$d\lambda$ Phase shift Invention C comprises:

C1. Method for the analysis of a, particularly electromagnetic, wave field, particularly in relation to at least one propagation direction, particularly location, and/or orientation, wherein from at least one emission-device arrangement of an emitter, m signal sequences which are de-correlated against each other with A signals respectively having a known phase relation to each other, are emitted via s different emission devices and/or different places and/or orientations of the emission-device arrangement, wherein s is greater than or equal to two, wherein A is greater than or equal to two and wherein particularly m is greater than or equal to two, and wherein at at least one, particularly mobile, receiver, particularly with only one reception device, reception is made, wherein an emission characteristic of the emission-device arrangement is being used, particularly in the form of at least one matrix, in order to determine the propagation direction of the signals to the receiver, particularly location and/or orientation of the receiver as seen relatively from the emitter and/or of the emitter.

C2. Method according to C1, wherein the A signals are being emitted at least partially chronologically off-set and/or one signal respectively of several signal sequences are being emitted simultaneously, particularly via an emission device.

C3. Method wherein for a de-correlation of the signal sequences against each other, different frequencies, polarizations and/or amplitudes are being used.

C4. Method wherein a matrix, particularly auto-correlation matrix AKM is used, which is elaborated or calculated from n not fully correlated measuring vectors of the m signal sequences, which measuring vectors were taken at the receiver, wherein said measuring vectors respectively are formed by measurements of at least two of the A signals of one of the m signal sequences, in order to determine, particularly by way of distance calculation between matrix and emission characteristic, particularly by way of projection, particularly between a sub-space of said matrix and said emission characteristic, the propagation direction of the signals to the receiver, particularly the location of the receiver and/or emitter, where n at least is equal to two, particularly equal to the number of emitted de-correlated signals, particularly equal to m.

C5. Method wherein said emission characteristic contains at least one, particularly a multitude of, s×2 dimensional object(s), which particularly indicates in the first column which signal or respectively signal relations are to be received, when the emitter is arranged in a first orientation, particularly polarization, to the s emission devices or respectively emission positions- and/or orientations and particularly indicates in the second column, which signal respectively which signal relations are to be received, when the receiver is arranged in a second orientation, particularly polarization, to the s emission devices and wherein each line indicates, which signal and/or signal relation is to be received in the emission from one of the s emission devices, wherein particularly the different objects are allocated to one propagation direction respectively.

C6. Method wherein at least two emission-device arrangements with respectively at least two emission devices are being used and the propagation direction of the signals to the at least one receiver, particularly orientation and/or location of the at least one receiver and/or emission-device arrangements or respectively emitters on the basis of the emission characteristics of the at least two emission-device arrangements, which can be identical, is being determined.

C7. Method wherein, if desired with the use of additional methods, the position and/or orientation of the at least one receiver is being determined.

C8. Method wherein a distance calculation is performed via projection between the Eigen-vector-(sub)space of the auto-correlation matrix AKM and the emission characteristic.

C9. Method wherein an element of the emission characteristic is multiplied with the inverse matrix, particularly the inverse AKM.

C10. Method wherein the matrix is an auto-correlation matrix AKM of measurement vectors and in that on the basis of Eigen values of said AKM, particularly from their relations, particularly by way of division by the square of each associated linear coefficient of the emission characteristic which is emitted into the (sub)space, at least relative upper power limits of wave-field portions are determined.

C11. Method wherein said emission characteristic provides a multitude of components, particularly matrices and in that particularly the individual emission-characteristic components are orthogonalized.

C12. Device for the at least relative orientation- and or at least relative position determination of a receiver comprising a reception device and at least one stored emission characteristic of at least two emission devices and/or means for their calculation and/or reception and means for the calculation of the orientation and/or location of said receiver.

C13. System for the at least relative orientation- and/or at least relative position determination of a receiver comprising at least one emission-device arrangement with at least two, particularly s, emission devices and/or equipped for the emission at/in at least two positions and/or orientations and equipped for the emission of m de-correlated signal sequences providing at least respectively two signals, wherein at least two, particularly A signals provide a known phase relation to each other, and are being emitted via different emission devices and/or to/at different positions and/or orientations of the emission devices, as well as at least one stored emission characteristic of the at least one emission-device arrangement and/or means for its calculation as well as means for its transmission and/or reception of measurement values of a receiver and means for the calculation of the orientation and/or location of the receiver.

C14. System for the orientation- and or at least relative position determination of at least one receiver, comprising at least one emission-device arrangement with at least two emission devices and/or equipped for emission at/in at least two positions and/or orientations and equipped for the emission of m de-correlated signal sequences, wherein particularly m is at least equal to two, wherein at least two of the m signal sequences provide at least two signals respectively with a known phase relation to each other, as well as at least one receiver and at least one stored emission characteristic of the emission-device arrangement and/or means for their calculation and particularly means for the reception of measuring values of a receiver and/or means for the transmission of the emission characteristic and means for the calculation of the orientation and/or location of the receiver.

C15. System or device comprising means for the generation of a matrix, particularly of the auto-correlation matrix, of at least two not completely correlated measurement vectors of the receiver of respectively one signal sequence with respectively at least two measuring values and particularly means for distance calculation between matrix and emission characteristic, particularly via projection, particularly between a sub-space of the matrix and of the emission characteristic.

C16. Use of at least one emission characteristic of an emission device arrangement with at least two emission devices, in order to determine, by way of distance calculation between a matrix generated or calculated from at least two not completely correlated measurement vectors of the reception device of at least two signal sequences of the emission device with at least two measurement values of the signals of each signal sequence with a known phase relation, particularly auto-correlation matrix, particularly via projection, particularly between a sub-space of the matrix and of the emission characteristic, the propagation direction of the signals to the receiver, particularly orientation and/or location of the receiver and/or of the emission device.

The invention claimed is:

1. A method to determine a propagation direction for an electromagnetic wave field, the method enabling numerous receivers to determine their location simultaneously without having to make their location or their presence known, said method comprising:
providing an emitter with at least one emission-device arrangement; wherein the at least one emission-device arrangement includes s different emission devices or includes different places or different orientations of the at least one emission-device arrangement;
emitting m electromagnetic signal sequences from the s different emission devices or places or orientations; wherein the m signal sequences include A against each other de-correlated signals, wherein the A signals have a known phase relation to each other; and wherein s is greater than or equal to two, wherein A is greater than or equal to two and wherein m is greater than or equal to two; and the A signals are emitted at different frequencies, polarizations or amplitudes for the de-correlation of the signal sequences against each other;
providing at least one receiver of the numerous receivers;
receiving the A signals with the at least one receiver; and
using an emission characteristic of the emission-device arrangement for calculating with a computing unit a propagation direction of the m signal sequences from the emitter to the at least one receiver as seen relatively from the emitter by calculating, with a computing unit, a distance between the emission characteristic and a matrix; said matrix being generated or calculated from at least two not completely correlated measurement vectors of the at least one receiver of the reception of the m signal sequences of the emission device;
wherein said emission characteristic indicates which signal or respectively signal relations are to be received when the emitter is arranged in a first orientation and which signal or respectively signal relations are to be received when the emitter is arranged in a second orientation; the first and second orientations being defined relative to the s emission devices or to the emission positions or orientations to which signal relations are to be received.

2. The method as defined in claim 1, further comprising:
emitting the A signals at least partially chronologically off-set from each other or emitting several signal sequences of two or more A signals simultaneously via at least one emission device of the s different emission devices.

3. The method as defined in claim 2, wherein the step of emitting the A signals includes emitting one signal of several signal sequences simultaneously via the emission device.

4. The method as defined in claim 1, further comprising:
using measurements of at least two of the A signals of one of the m signal sequences as measuring vectors at the receiver;
using the matrix calculated in the computing unit or in a second computing unit, where the matrix is elaborated or calculated from n not fully correlated measuring vectors of the m signal sequences; and
determining the propagation direction of the A signals of the m signal sequences to the receiver where n at least is equal to two.

5. The method as defined in claim 4, wherein the step of using the matrix comprises using an auto-correlation matrix (AKM).

6. The method as defined in claim 4, wherein the step of calculating the propagation direction further comprises:
performing a distance calculation between the matrix and the emission characteristic.

7. The method as defined in claim 6, wherein the step of performing the distance calculation includes projecting between a sub-space of the matrix and the emission characteristic.

8. The method as defined in claim 4, wherein the step of elaborating or calculating the matrix using a number of n not fully correlating measuring vectors that is equal to a number of emitted de-correlated signals.

9. The method as defined in claim 1, wherein the step of using the emission characteristic comprises:
using an emission characteristic containing at least one two-dimensional object having dimensions of s×2; and
indicating by each line which signal or signal relation is to be received in the emission from one of the s emission devices.

10. The method as defined in claim 1, further comprising:
using at least two emission-device arrangements with at least two emission devices; and
determining the propagation direction of the A signals of the m signal sequences to the at least one receiver.

11. The method as defined in claim 1, determining a position or orientation of the at least one receivers based on the propagation direction and a location or orientation of the emitter.

12. The method as defined in claim 1, further comprising:
performing in the computing unit a distance calculation via projection between an Eigen-vector-(sub)space of an auto-correlation matrix AKM and the emission characteristic of the emission-device arrangement.

13. The method as defined in claim 1, further comprising:
multiplying an element of the emission characteristic with an inverse matrix.

14. The method as defined in claim 1, wherein the step of providing the at least one receiver comprises providing a mobile receiver.

15. The method as defined in claim 1, wherein the step of utilizing an emission characteristic of the emission-device arrangement comprises utilizing an emission characteristic in the form of at least one matrix that is programmed in, calculated in or transmitted to the computing unit.

16. The method as defined in claim 15, further comprising:
determining at least relative upper power limits of wave-field portions when the at least one matrix is an auto-correlation matrix AKM of measurement vectors and on the basis of Eigen values of said AKM.

17. The method as defined in claim 16, wherein the step of determining at least relative upper power limits of wave-field portions includes dividing each associated linear coefficient of the emission characteristic which is emitted into a subspace by a square thereof.

18. The method as defined in claim 1, wherein the step of using the emission characteristic of the emission-device arrangement comprises using the emission characteristic of the emission-device arrangement to calculate the location or orientation of the receiver relative to the emitter.

19. The method as defined in claim 1, wherein the step of using the emission characteristic of the emission-device arrangement comprises using the emission characteristic of the emission-device arrangement and the location or orientation of the emitter to determine the location or orientation of the receiver.

20. The method as defined in claim 1, wherein the step of calculating the propagation direction further comprises:
storing at least one emission characteristic of each of the at least two emission devices in the computing unit; or
providing programming in the computing unit to calculate the at least one emission characteristic of each of the at least two emission devices; and
using the stored or calculated at least one emission characteristics in the computing unit to calculate an orientation or a location of said receiver.

21. The method as defined in claim 1, wherein each of the numerous receivers is a mobile telephone.

22. A device for the at least relative orientation or at least relative position determination of a receiver in an electromagnetic wave field; said device comprising;
a reception device; and
at least one stored emission characteristic of each of at least two emission devices; or a means for calculation of the at least one emission characteristic of each of the at least two emission devices; or the reception of such emission characteristics and a means for the calculation of an orientation or a location of said reception device by calculating, with a computing unit, a distance between a matrix and the emission characteristic, the matrix being generated or calculated from at least two not completely correlated measurement vectors of the reception device of the m signal sequences of the emission device;
wherein said emission characteristic indicates which signal or respectively signal relations are to be received when the emitter is arranged in a first orientation and which signal or respectively signal relations are to be received when the emitter is arranged in a second orientation; the first and second orientations being defined relative to the s emission devices or to the emission positions or orientations to which signal relations are to be received.

23. The device as defined in claim 22, wherein the reception device is a mobile telephone.

24. A use of at least one emission characteristic of an emission-device arrangement with at least two emission devices, comprising:
generating an electromagnetic emission of at least two emission sequences having signals with a known phase relation from the at least two emission devices, wherein the signals are emitted at different frequencies, polarizations or amplitudes for the de-correlation of the signal sequences against each other;
determining a propagation direction of signals from the emission-device arrangement to a reception device by calculating, with a computing unit, a distance between the emission characteristic and a matrix generated or calculated from at least two not completely correlated measurement vectors of the reception device of the at least two signal sequences of the emission device;
wherein said emission characteristic indicates which signal or respectively signal relations are to be received when the emitter is arranged in a first orientation and which signal or respectively signal relations are to be received when the emitter is arranged in a second orientation; the first and second orientations being defined relative to the s emission devices or to the emission positions or orientations to which signal relations are to be received.

25. The use as defined in claim 24, wherein the step of generating the matrix comprises generating an auto-correlation matrix.

26. The use as defined in claim 24, wherein the step of determining an orientation or a location of the reception device or of the emission based on the propagation direction and the location or orientation of the emitter is included.

27. The use as defined in claim 24, wherein the reception device is a mobile telephone.

28. A system for the least relative orientation or at least relative position determination of a receiver enabling numerous receivers to determine their location simultaneously, without having to make their location or their presence known, said system comprising:

at least one emission-device arrangement with s emission devices or equipped for an emission at s positions or in s orientations; and equipped for emission of m de-correlated electromagnetic signal sequences providing at least two respective signals, wherein A signals provide a known phase relation to each other and are being emitted via different emission devices or at different positions or orientations of the emission devices, wherein the A signals are at different frequencies, polarizations or amplitudes for the de-correlation of the signal sequences against each other;

at least one receiver of the numerous receivers; and at least one stored emission characteristic of the at least one emission device arrangement or a means for the calculation of an emission characteristic of the at least one emission device arrangement or means for the transmission of measurement values of the at least one receiver and means to determine a propagation direction of the m signal sequences from the emission devices to the at least one receiver as seen relatively from the emission device arrangement; and wherein s is at least two and A is at least two; and a computing unit for calculating a distance between a matrix and the emission characteristic, the matrix being generated or calculated from at least two not completely correlated measurement vectors of the at least one receiver of the reception of the m signal sequences of the emission device;

wherein said emission characteristic indicates which signal or respectively signal relations are to be received when the emitter is arranged in a first orientation and which signal or signal relations are to be received when the emitter is arranged in a second orientation; the first and second orientations being defined relative to the s emission devices or to the emission positions or orientations to which signal relations are to be received.

29. The system as defined in claim 28, wherein each of the numerous receivers is a mobile telephone.

* * * * *